United States Patent
Kasapidis

(10) Patent No.: US 8,098,626 B2
(45) Date of Patent: Jan. 17, 2012

(54) PACKET TRANSFER CONTROL METHOD, COMMUNICATION MESSAGE PROCESSING METHOD, ACCESS ROUTER, AND MOBILE TERMINAL

(75) Inventor: Makis Kasapidis, Edinburgh (GB)

(73) Assignee: Panasonic Corporation, Osaka (JP)

( * ) Notice: Subject to any disclaimer, the term of this patent is extended or adjusted under 35 U.S.C. 154(b) by 1016 days.

(21) Appl. No.: 11/814,138

(22) PCT Filed: Jan. 27, 2006

(86) PCT No.: PCT/JP2006/301312
§ 371 (c)(1),
(2), (4) Date: Oct. 12, 2007

(87) PCT Pub. No.: WO2006/080437
PCT Pub. Date: Aug. 3, 2006

(65) Prior Publication Data
US 2009/0003280 A1    Jan. 1, 2009

(30) Foreign Application Priority Data
Jan. 28, 2005   (JP) ................................. 2005-022143

(51) Int. Cl.
*H04W 4/00* (2009.01)
*H04W 36/00* (2009.01)
*G06F 15/16* (2006.01)

(52) U.S. Cl. .......................... 370/331; 455/436; 709/227

(58) Field of Classification Search .................. None
See application file for complete search history.

(56) References Cited

U.S. PATENT DOCUMENTS

| 2003/0225892 | A1* | 12/2003 | Takusagawa et al. | 709/227 |
| 2005/0083885 | A1* | 4/2005 | Ikeda et al. | 370/331 |
| 2006/0036764 | A1* | 2/2006 | Yokota et al. | 709/240 |

FOREIGN PATENT DOCUMENTS

| JP | 2001-339752 | 12/2001 |
| JP | 2005-311580 | 11/2005 |

OTHER PUBLICATIONS

Rajeev Koodli, "Fast Handovers for Mobile IPv6", Internet draft, draft-ieff-mobileip-fast-mipv6-08. txt, Oct. 2003.
Rajeev Koodli; "Fast Handovers for Mobile IPv6"; draft-ietf-mipshop-fast-mipv6-03.txt; Oct. 25, 2004.
Mark Parris, Kevin Jeffay and F. Donelson Smith; "Lightweight Active Router-Queue Management for Multimedia Networking"; ACM/SPIE Multimedia Computing and Networking 1999, Jan. 1999.

* cited by examiner

*Primary Examiner* — Clemence Han
(74) *Attorney, Agent, or Firm* — Pearne & Gordon LLP

(57) ABSTRACT

Provided is a technique for eliminating buffer and transfer of a packet which is not required for an MN in a handover mechanism in which a packet to be sent to the MN performing handover is buffered and the buffered packet is supplied to the MN after the handover. Before handover, a mobile terminal (MN) notifies an access router (nAR) to be newly connected after the handover of information (buff_time/flow) indicating a correspondence between a flow label of a packet concerned with packet communication and a buffer time based on a delay allowance time of an application using the packet having the flow label. The nAR buffers the packet while the MN performs the handover. When performing packet transfer to the MN connected after the handover, the nAR does not transfer, to MN, the packet stored for a predetermined buffer time or more among the packets stored in the buffer.

11 Claims, 12 Drawing Sheets

| FLOW LABEL | BUFFER TIME |
|---|---|
| flow_A | buff_time_A |
| flow_B | buff_time_B |
| flow_C | buff_time_C |

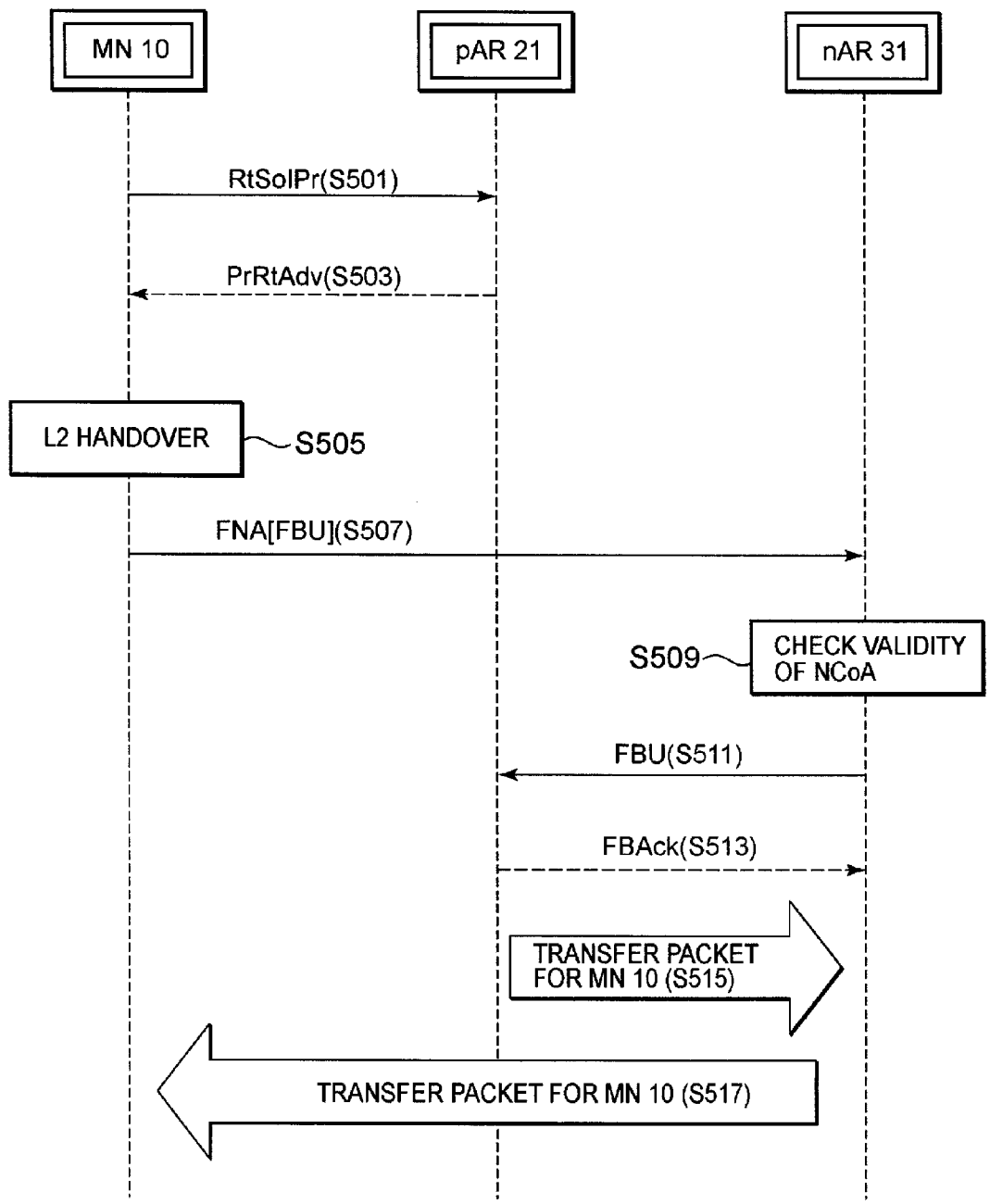

PACKET TRANSFER CONTROL METHOD, COMMUNICATION MESSAGE PROCESSING METHOD, ACCESS ROUTER, AND MOBILE TERMINAL

TECHNICAL FIELD

The present invention relates to a packet transfer control method, a communication message processing method, an access router and a mobile terminal concerned with handover of a mobile terminal which performs wireless communication. The present invention more particularly relates to a packet transfer control method, a communication message processing method, an access router and a mobile terminal concerned with a mobile terminal which performs wireless communication by use of Mobile Internet Protocol version 6 (Mobile IPv6) as the next-generation internet protocol.

BACKGROUND ART

Heretofore, as a technology for minimizing packet losses, which cannot be prevented by usual layer 3 handover using a technology of a mobile IP, to provide effective means for an internet application requiring a real-time property, a fast handover technology (hereinafter referred to as fast handovers for mobile IP (FMIP)) is disclosed in the following Non-patent Document 1. The FMIP will hereinafter be described with reference to FIGS. 12 to 14.

A wireless communication system shown in FIG. 12 includes an IP network (a communication network) 15 such as an internet, a plurality of subnets (also referred to as sub-networks) 20, 30 connected to the IP network 15, and a mobile terminal (mobile node: MN) 10 connectable to any of these subnets 20, 30. It is to be noted that FIG. 12 shows two subnets 20, 30 as the plurality of subnets 20, 30.

The subnet 20 includes an access router 21 which routes an IP packet (packet data), and a plurality of access points (APs) 22, 23 which form inherent wireless coverages (communicable areas) 24, 25, respectively. These APs 22, 23 are connected to the pAR 21, respectively, and the pAR 21 is connected to the IP network 15. FIG. 12 shows two APs 22, 23 as a plurality of APs 22, 23. The subnet 30 is also constituted of an access router 31 and a plurality of APs 32, 33 in accordance with the same connecting configuration as that of the above subnet 20.

It is to be noted that, here, it is assumed that, in a case where the MN 10 moves into a wireless coverage 34 formed by the AP 32 from the wireless coverage 25 formed by the AP 23 through an overlap area 26, the subnet 20 performs handover to the subnet 30. It is hereinafter assumed that an access router positioned above the AP 23 and connected to the MN 10 before the handover is referred to as the previous access router (pAR) 21 and that an access router positioned above the AP 32 connected to the MN 10 after the handover is referred to as the new access router (nAR) 31.

Moreover, the pAR 21 which is a constituting element of the subnet 20 can communicate with the nAR 31 which is a constituting element of the subnet 30 via the IP network 15. That is, the subnet 20 is connected to the subnet 30 via the IP network 15.

Next, an operation of the FMIP will be described with reference to FIG. 12. The FMIP has two operation modes (a predictive mode and a reactive mode), depending on whether or not the MN 10 receives a fast binding acknowledgement (FBAck) message at a link (the link before the handover) connected to the MN before the handover.

First, the predictive mode of the FMIP in a case where the MN 10 transmits a fast binding update (FBU) message at the link before the handover will be described. FIG. 13 is a sequence chart showing outlines of the operation modes of the FMIP in a case where the MN transmits the FBU message at the link before the handover according to a conventional technology.

For example, when the MN 10 starts moving from the area of the pAR 21 (the wireless coverage 25 of the AP 23) to the area of the nAR 31 (the wireless coverage 34 of the AP 32), Layer 2 detects the movement of the MN. Starting with this detection, Layer 3 starts the handover. This start of the handover is determined by comparing, for example, a reception electric intensity from the AP 23 with that from the AP 32 in the overlap area 26.

In a case where information including AP-ID (identification information of each AP) of the AP 32 as a movement destination is notified from Layer 2, the MN 10 transmits a router solicitation for proxy advertisement (RtSolPr) message including the AP-ID of the AP 32 to the presently connected pAR 21 (step S401). The pAR 21 which has received this RtSolPr message searches for the access router existing in the neighborhood based on the AP-ID of the AP 32 notified from the MN 10 to acquire information of the nAR 31, or acquires the information of the nAR 31 from the information which has already been searched (the information retained by the pAR 21).

Moreover, the pAR 21 transmits, as a response to the RtSolPr message, a proxy router advertisement (PrRtAdv) message including the information of the nAR 31 (e.g., information such as a network prefix of the subnet 30 constituted of the nAR 31) to the MN 10 (step S403). The MN 10 which has received the PrRtAdv message generates new care of address (NCoA) which is an address adaptable to the subnet 30 by use of the network prefix of the subnet 30 included in the PrRtAdv message, a link layer address of the MN 10 itself and the like, and transmits the FBU message including this NCoA to the pAR 21 (step S405).

The pAR 21 which has received the FBU message transmits a handover initiation (HI) message including this NCoA to the nAR 31 in order to confirm whether or not the NCoA generated by the MN 10 is an address usable by the subnet 30 (step S407). On receiving the HI message, the nAR 31 verifies whether or not the NCoA included in this HI message is valid. If the NCoA is valid, a handover acknowledgement (HAck) message in which a status indicating a result of the verification is designated is transmitted to the pAR 21 (step S409). On received the HAck message, the pAR 21 transmits an FBAck message notifying the result to the MN 10 and the nAR 31 (steps S411, S413), and further transmits a packet to be sent to the MN 10 to the nAR 31 (step S415). When the packet to be sent to the MN 10 is transferred from the pAR 21, the nAR 31 buffers the packet. It is to be noted that it is preferable that an operation of transferring the packet to be sent to the MN 10 to the nAR 31 in the step S415 is started immediately after the MN 10 leaves the subnet 20 in step S417 described later.

Moreover, the MN 10 actually starts moving to the subnet 30, and performs, for example, L2 (Layer 2) handover from the AP 23 to the AP 32 (step S417). Immediately after switching the connection to the nAR 31, a fast neighbor advertisement (FNA) message for notifying the connection to the nAR 31 and requiring transmission of the buffered packet is transmitted to the nAR 31 (step S419). The nAR 31 receives this FNA message to transmit the buffered packet to be sent to the MN 10 to the MN 10 (step S421).

Next, the operation mode (the reactive mode) of the FMIP in a case where the MN 10 does not transmit any FBU message at the link before the handover and transmits the FNA (the message including the FBU) at the link after the handover will be described. FIG. 14 is a sequence chart showing an outline of the operation mode of the FMIP in a case where the MN according to the conventional technology transmits the FNA [FBU] message at the link after the handover.

The MN 10 transmits the RtSolPr message (step S501) and receives the PrRtAdv message (step S503) in the same manner as in the operation mode shown in FIG. 13. However, subsequently, the transmission of the FBU message (the step S405 of FIG. 13) in the operation mode shown in FIG. 13 is not performed. The MN actually starts moving to the subnet 30 to perform, for example, L2 handover from the AP 23 to the AP 32 or the like (step S505).

Moreover, immediately after switching the connection to the nAR 31, the MN 10 transmits, to the nAR 31, the FNA message including the FBU message (this message is referred to as the FNA [FBU]) (step S507). The nAR 31 verifies validity of the NCoA included in the FNA message (step S509). In a case where this NCoA is valid, the FBU message is transmitted to the pAR 21 (step S511).

The pAR 21 transmits the FBAck message, as a response to this FBU message, to the nAR 31 (step S513), and further transfers the packet to be sent to the MN 10 to the nAR 31 (step S515). The nAR 31 receives the FBAck message from the pAR 21, and transfers, to the MN 10, the packet to be sent to the MN 10 received from the pAR 21 (step S517). It is to be noted that, to realize the packet transfer of the steps S515 and S517, it is described in Non-patent Document 1 that the pAR 21 may buffer the packet to be sent to the MN 10 received after the MN 10 leaves the subnet 20 to transfer the packet to the nAR 31.

In a case where the FMIP is not used, the packet to be received by the MN 10 is lost from a time when the MN 10 leaves the pAR 21 until the subnet 30 of the nAR 31 completes the binding update. On the other hand, according to the FMIP, when the nAR 31 (in the predictive mode) or the pAR 21 (the reactive mode) buffers the packet to be sent to the MN 10, the MN 10 after the handover can receive all of these packets, and the packet loss during the handover can be minimized. It is to be noted that the above FMIP is one example of a handover mechanism in which the packet to be sent to the MN 10 is buffered during the handover and in which the buffered packet is supplied to the MN 10 after the handover, and there is another handover mechanism capable of achieving a similar object.

Moreover, heretofore, a method of buffering the packet in the router has been considered (e.g., see Non-patent Document 2 described as follows). For example, the router stores the received packet in a queue, and transmits the queued packet. In a case where a predetermined number of or more packets are stored in the queue, an operation of discarding the packet at random or the packet having low priority is performed. It is to be noted that a header of the IPv6 packet is provided with a traffic class and a flow label for a purpose of control of quality of service (QoS). For example, according to these information, the priority, flow and the like of the IPv6 packet can be identified.

Non-Patent Document 1: Rajeev Koodli, "Fast Handovers for Mobile IPv6", draft-ietf-mipshop-fast-mipv6-03.txt, 25 Oct. 2004

Non-Patent Document 2: Mark Parris, Kevin Jeffay and F. Donelson Smith, "Lightweight Active Router-Queue Management for Multimedia Networking", ACM/SPIE Multimedia Computing and Networking 1999, January 1999.

According to the FMIP, all the packets for the MN are once buffered in the nAR (the predictive mode) or the pAR (the reactive mode) are once buffered, and then transmitted to the MN which has completed the handover. As a result, the packet loss is largely reduced, but delay of the packet cannot completely be eliminated. On the other hand, among the applications, there is an application which does not permit delay of a predetermined time or more. In a case where a delay time of the packet due to the handover exceeds a delay allowance time inherent in this application, the packet is not required for the MN, and is discarded at the MN. Therefore, according to the FMIP, the packets buffered and supplied to the MN after the handover includes the packet which is discarded at the MN.

When the packet discarded at the MN is buffered and transferred, the following two problems are mainly derived.

1. Useless consumption of resource

A packet retaining area of a buffer is consumed by the unnecessary packet, and a band is consumed by the transfer of the packet.

2. Induction of further packet loss

If the unnecessary packet is transferred, the transfer of the packet which is to reach the MN in a predetermined time delays. As a result, there is a possibility that an extra time (a standby time due to the transfer of the unnecessary packet and the like) is required until the packet reaches the MN and that the packet is discarded at the MN.

It is to be noted that as described above, the pAR and the nAR can perform the QoS control in accordance with the information of the traffic class and the flow label of the header of the packet. However, the information of the traffic class is general information which indicates the priority of the packet, and the packet having the low priority indicated by the information of the traffic class is discarded in accordance with a delay situation and a congestion situation. Therefore, at the pAR and the nAR, the packet having the low priority indicated by the information of the traffic class might be discarded in accordance with a capacity of the buffer for storing the packet. However, even after the elapse of the delay allowance time, a delay sensitive packet having high priority (the delay sensitive packet has a high possibility that the priority is set to be high) is transferred to the MN. Therefore, the above problem of the present invention is not solved.

Moreover, the information of the flow label realizes more specific identification. According to this information of the flow label, for example, the application in which the packet is used and the like can be identified. However, information on the flow of the packet, the delay allowance time of the packet and the application in which the packet is for use can be grasped with an only application level (i.e., only two end nodes including the MN and a correspondent node (CN) which is a communication partner). The pAR and the nAR which simply buffer and transfer the packet in response to the movement of the MN cannot judge the packet to be transferred and the packet which is not required any more and which should be discarded.

DISCLOSURE OF THE INVENTION

In view of the above problems, the present invention has been developed, and an object thereof is to provide a packet transfer control method, a communication message processing method, an access router and a mobile terminal for eliminating buffer or transfer of a packet unnecessary for the mobile terminal to realize optimum packet transfer during handover in a handover mechanism in which a packet to be sent to the mobile terminal is buffered while the handover is performed and in which the buffered packet is supplied to the mobile terminal after the handover.

To achieve the above object, a packet transfer control method of the present invention is a packet transfer control method in a case where a mobile terminal performs handover from a first access point to a second access point in a communication system in which a first access router having the first access point thereunder is connected to a second access router having the second access point thereunder via a communication network, the method comprising:

a packet storage step in which at least one of the first and second access routers stores a packet to be sent to the mobile terminal that is arrived while the mobile terminal performs processing concerned with the handover;

an information notifying step in which the mobile terminal transmits information indicating a correspondence between packet identification information to identify a type of the packet concerned with packet communication performed by the mobile terminal and a time based on a delay allowance time concerned with the packet having the packet identification information to transmit the information indicating the correspondence to at least one of the first and second access routers storing the packets; and a transfer control step of performing control so that at least one of the first and second access routers in which the packets are stored does not transfer, to the mobile terminal which has completed the handover, the packet stored in excess of the time based on the delay allowance time among the packets stored in the packet storage step, based on the information indicating the correspondence obtained in the information notifying step, when the packets stored in the packet storage step are transferred, and transferring the remaining packets.

According to this constitution, in the handover mechanism in which the packet to be sent to the mobile terminal is buffered during the handover and the buffered packet is supplied to the mobile terminal after the handover, it is possible to eliminate the buffer and the transfer of the packet which is not required for the mobile terminal and realize optimum packet transfer during the handover.

Moreover, to achieve the above object, a packet transfer control method of the present invention is a packet transfer control method in a case where a mobile terminal performs handover from a first access point to a second access point in a communication system in which a first access router having the first access point thereunder is connected to a second access router having the second access point thereunder via a communication network, the method comprising:

a handover determination step in which the mobile terminal connected to the first access point determines that the handover from the first access point to the second access point be performed, and acquires identification information of the second access point from the second access point;

a first information notifying step in which the mobile terminal notifies the first access router, via the first access point, of information indicating a correspondence between the identification information of the second access point and packet identification information to identify a type of the packet concerned with packet communication performed by the mobile terminal and a time based on a delay allowance time concerned with the packet having the packet identification information;

a second information notifying step in which the first access router notifies the second access router specified by the identification information notified from the mobile terminal of the information indicating the correspondence;

a packet storage step in which the second access router stores the packet to be sent to the mobile terminal, while the mobile terminal performs processing concerned with the handover;

a connection establishment step in which the mobile terminal is connected to the second access point, and then establishes the connection to the second access router; and a transfer control step of performing control so that the second access router does not transfer, to the mobile terminal the connection to which has been established in the connection establishment step, the packet stored in excess of the time based on the delay allowance time among the packets stored in the packet storage step, based on the information indicating the correspondence obtained in the second information notifying step, and transferring the remaining packets.

According to this constitution, in the handover mechanism in which the packet to be sent to the mobile terminal is buffered during the handover and the buffered packet is supplied to the mobile terminal after the handover, the mobile terminal transmits the information to specify a delay packet which is not required at an application level before the handover. In consequence, it is possible to eliminate the buffer and the transfer of the packet which is not required for the mobile terminal and realize optimum packet transfer during the handover.

Furthermore, in the packet transfer control method of the present invention, in addition to the above constitution, the first information notifying step embeds the information indicating the correspondence in an RtSolPr message or an FBU message of an FMIP to transmit the information from the mobile terminal to the first access router.

According to this constitution, the information to specify the delay packet can be transmitted by use of a message for use in a predictive mode of the FMIP.

In addition, in the packet transfer control method of the present invention, in addition to the above constitution, the second information notifying step embeds the information indicating the correspondence in an HI message of an FMIP to transmit the information from the first access router to the second access router.

According to this constitution, the information to specify the delay packet can be transmitted by use of the message for use in the predictive mode of the FMIP.

In addition, to achieve the above object, a packet transfer control method of the present invention is a packet transfer control method in a case where a mobile terminal performs handover from a first access point to a second access point in a communication system in which a first access router having the first access point thereunder is connected to a second access router having the second access point thereunder via a communication network, the method comprising:

a handover determination step in which the mobile terminal connected to the first access point determines that the handover from the first access point to the second access point be performed;

a connection establishment step in which the mobile terminal is connected to the second access point, and then establishes the connection to the second access router;

a first information notifying step in which the mobile terminal notifies the second access router, via the second access point, of information indicating a correspondence between identification information of the first access router and packet identification information to identify a type of the packet concerned with packet communication performed by the mobile terminal and a time based on a delay allowance time concerned with the packet having the packet identification information;

a second information notifying step in which the second access router notifies the first access router specified by the identification information notified from the mobile terminal of the information indicating the correspondence;

a packet storage step in which the first access router stores the packet to be sent to the mobile terminal, while the mobile terminal performs processing concerned with the handover;

a transfer control step of performing control so that the second access router does not transfer, to the first access router, the packet stored in excess of the time based on the delay allowance time among the packets stored in the packet storage step, based on the information indicating the correspondence obtained in the second information notifying step, and transferring the remaining packets; and a transfer step in which the second access router transfers, to the mobile terminal, the packet received from the first access router.

According to this constitution, in the handover mechanism in which the packet to be sent to the mobile terminal is buffered during the handover and the buffered packet is supplied to the mobile terminal after the handover, the mobile terminal transmits the information to specify the delay packet which is not required at the application level immediately after the handover. In consequence, it is possible to eliminate the buffer and the transfer of the packet which is not required for the mobile terminal and realize optimum packet transfer during the handover.

Furthermore, in the packet transfer control method of the present invention, in addition to the above constitution, the first information notifying step embeds the information indicating the correspondence in an FNA message including an FBU message of an FMIP to transmit the information from the mobile terminal to the second access router.

According to this constitution, the information to specify the delay packet can be transmitted by use of a message for use in a reactive mode of the FMIP.

In addition, in the packet transfer control method of the present invention, in addition to the above constitution, the second information notifying step embeds the information indicating the correspondence in an FBU message of an FMIP to transmit the information from the second access router to the first access router.

According to this constitution, the information to specify the delay packet can be transmitted by use of a message for use in a reactive mode of the FMIP.

Moreover, to achieve the above object, a packet transfer control method of the present invention is a packet transfer control method of at least one of first and second access routers in a case where a mobile terminal performs handover from a first access point to a second access point in a communication system in which the first access router having the first access point thereunder is connected to the second access router having the second access point thereunder via a communication network, the method comprising:

a packet storage step of storing a packet to be sent to the mobile terminal which is arrived while the mobile terminal performs processing concerned with the handover;

an information acquiring step of acquiring information which is grasped by the mobile terminal and which indicates a correspondence between packet identification information to identify a type of the packet concerned with packet communication performed by the mobile terminal and a time based on a delay allowance time concerned with the packet having the packet identification information; and a transfer control step of performing control so that the packet stored in excess of the time based on the delay allowance time among the packets stored in the packet storage step is not transferred, based on the information indicating the correspondence obtained in the information acquiring step, when the packets stored in the packet storage step are transferred to the mobile terminal which has completed the handover, and transferring the remaining packets.

According to this constitution, in the handover mechanism in which the packet to be sent to the mobile terminal is buffered during the handover and the buffered packet is supplied to the mobile terminal after the handover, it is possible to eliminate the buffer and the transfer of the packet which is not required for the mobile terminal and realize optimum packet transfer during the handover.

Furthermore, to achieve the above object, a communication message processing method of the present invention is a communication message processing method of a mobile terminal which performs handover from a first access point to a second access point in a communication system in which a first access router having the first access point thereunder is connected to a second access router having the second access point thereunder via a communication network, comprising:

a message generation step of generating a message to notify the first or second access router configured to store a packet to be sent to the mobile terminal which is arrived while the mobile terminal performs processing concerned with the handover and configured to transfer the stored packet to the mobile terminal after the mobile terminal has completed the handover of information indicating a correspondence between packet identification information to identify a type of the packet concerned with packet communication performed by the mobile terminal and a time based on a delay allowance time concerned with the packet having the packet identification information.

According to this constitution, in the handover mechanism in which the packet to be sent to the mobile terminal is buffered during the handover and the buffered packet is supplied to the mobile terminal after the handover, it is possible to eliminate the buffer and the transfer of the packet which is not required for the mobile terminal and realize optimum packet transfer during the handover.

In addition, in order to achieve the above object, an access router of the present invention is an access router having an access point thereunder and forming a subnet, the access router comprising:

packet transfer means for transferring a packet to a mobile terminal connected to the access point; packet storage means for storing the packet to be sent to the mobile terminal which is arrived, while the mobile terminal to perform handover from another subnet to the subnet or the mobile terminal to perform handover from the subnet to the other subnet performs processing concerned with the handover;

information acquiring means for acquiring information which is grasped by the mobile terminal and which indicates a correspondence between packet identification information to identify a type of the packet concerned with packet communication performed by the mobile terminal and a time based on a delay allowance time concerned with the packet having the packet identification information; ands transfer control means for performing control so that the packet stored in excess of the time based on the delay allowance time among the packets stored in the packet storage means is not transferred to the mobile terminal which has completed the handover, based on the information indicating the correspondence obtained by the information acquiring means, when the packets stored in the packet storage means are transferred to the mobile terminal, and transferring the remaining packets to the mobile terminal.

According to this constitution, in the handover mechanism in which the packet to be sent to the mobile terminal is buffered during the handover and the buffered packet is supplied to the mobile terminal after the handover, it is possible to eliminate the buffer and the transfer of the packet which is not required for the mobile terminal and realize optimum packet transfer during the handover.

Moreover, to achieve the above object, a mobile terminal of the present invention is a mobile terminal which is connected to a subnet formed by an access router having an access point thereunder, the mobile terminal comprising:

message generation means for generating a message to notify the access router configured to store a packet to be sent to the mobile terminal which is arrived while processing concerned with handover is performed in a case where the handover from the certain subnet to another subnet is performed and configured to transfer the stored packet to the mobile terminal after the mobile terminal has completed the handover of information indicating a correspondence between packet identification information to identify a type of the packet concerned with packet communication performed by the mobile terminal and a time based on a delay allowance time concerned with the packet having the packet identification information.

According to this constitution, in the handover mechanism in which the packet to be sent to the mobile terminal is buffered during the handover and the buffered packet is supplied to the mobile terminal after the handover, it is possible to eliminate the buffer and the transfer of the packet which is not required for the mobile terminal and realize optimum packet transfer during the handover.

The packet transfer control method, the communication message processing method, the access router and the mobile terminal of the present invention have the above constitutions. In the handover mechanism in which the packet to be sent to the mobile terminal is buffered during the handover and the buffered packet is supplied to the mobile terminal after the handover, it is constituted that the packet which is not required for the mobile terminal is not buffered or transferred. In consequence, the present invention has an effect that it is possible to realize the optimum packet transfer during the handover and save resources.

BRIEF DESCRIPTION OF THE DRAWINGS

FIG. 14 is a sequence chart showing an outline of the operation mode of the FMIP in a case where the MN of the prior art transmits an FNA [FBU] message at link after the handover.

BEST MODE FOR CARRYING OUT THE INVENTION

First and second embodiments of the present invention will hereinafter be described with reference to the drawings. A basic scheme of the present invention lies in that a mobile terminal (MN) which performs handover notifies an access router (nAR) to be newly connected after the handover of information (transfer unnecessary packet specifying information) to specify the packet which does not have to be transferred before or immediately after the handover of the MN and in that the nAR does not buffer or transfer the unnecessary packet. Examples of the transfer unnecessary packet specifying information include information of a flow label to identify a flow of the packet which is associated with a delay allowance time of an application level at which the packet of this flow is used. The nAR discards the packet buffered for the delay allowance time or more, and these packets are not transferred to the MN.

It is to be noted that the delay allowance time corresponds to a buffer time indicating an upper limit of a time to store the packet in the nAR. The delay allowance time of the application level may be equal to the buffer time. In consideration of transfer delay and packet processing delay, the MN and the nAR may convert the delay allowance time into the buffer time. In the following description, it is assumed that the MN notifies the nAR of the buffer time converted from the delay allowance time.

First Embodiment

Figure 1:
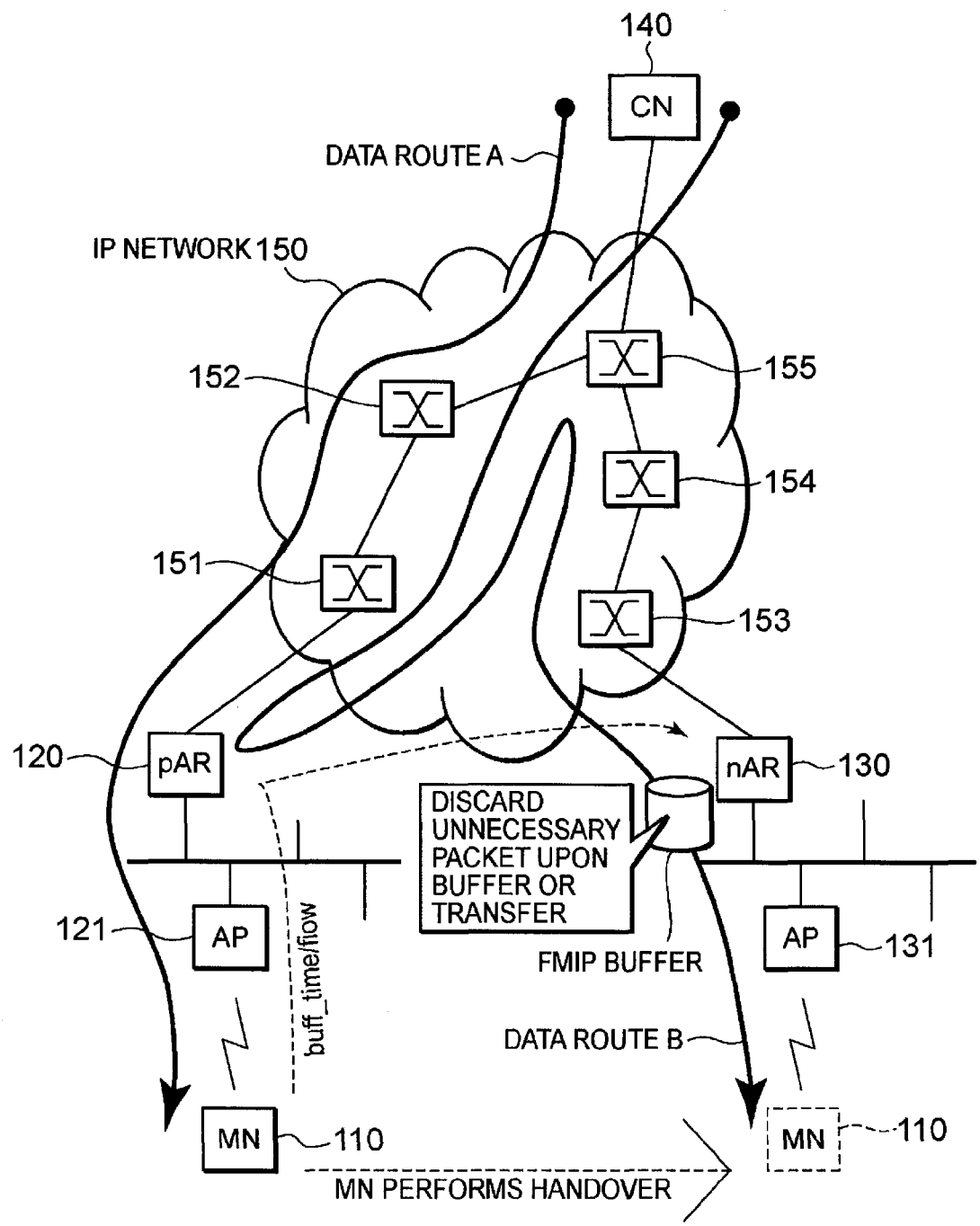
FIG. 1 is a diagram showing one example of a network constitution according to a first embodiment of the present invention.

First, the first embodiment of the present invention will be described. FIG. 1 is a diagram showing one example of a network constitution according to the first embodiment of the present invention. FIG. 1 shows an MN 110, a pAR 120, an AP 121 existing under the pAR 120, an nAR 130, an AP 131 existing under the nAR 130, a CN 140, and an IP network 150. It is to be noted that FIG. 1 shows only one CN 140, but the MN 110 can communicate with a plurality of CNs 140 via the IP network 150. That is, the plurality of CNs 140 may exist.

The pAR 120 and the nAR 130 are access routers connected to the IP network 150, and form subnets, respectively. When the MN 110 exists in a communication cell of the AP 121 existing under the pAR 120, the MN 110 can access the IP network 150 via the AP 121 and the pAR 120. For example, when the MN exists in a communication cell of the AP 131 existing under the nAR 130, the MN can access the IP network 150 via the AP 131 and the nAR 130. The CN 140 is a communication node connectable to the IP network 150, and can communicate with the MN 110 connected to the AP 121 and the AP 131.

On the other hand, the IP network 150 is, for example, a wide area network (WAN) in which IP communication such as internet is used. FIG. 1 shows five intermediate nodes (routers) 151 to 155 as network elements of the IP network 150. The intermediate node 151 links to the pAR 120 and the intermediate node 152, the intermediate node 152 links to the intermediate nodes 151 and 155, the intermediate node 153 links to the nAR 130 and the intermediate node 154, the intermediate node 154 links to the intermediate nodes 153 and 155, and the intermediate node 155 links to the intermediate nodes 152 and 154 and the CN 140, respectively.

Moreover, it is assumed that the MN 110 is connected to the AP 121 in an initial state, and communicates with the CN 140 through a data route A. The data route A is a route which connects the links of the CN 140, the intermediate node 155, the intermediate node 152, the intermediate node 151, the pAR 120, the AP 121 and the MN 110. On the other hand, in a handover mechanism (a smooth handover mechanism) such as an FMIP, during the handover of the MN 110, a packet is transferred from the pAR 120 to the nAR 130, and then buffered. Finally, the buffered packet is supplied to the MN 110 connected to the nAR 130. In this case, a passage route of the packet is a data route B shown in FIG. 1. The data route B is a route which connects the links of the CN 140, the intermediate node 155, the intermediate node 152, the intermediate node 151, the pAR 120, the intermediate node 151, the intermediate node 152, the intermediate node 155, the intermediate node 154, the intermediate node 153, the nAR 130, the AP 131 and the MN 110.

As shown in FIG. 1, in the nAR 130, a packet to be sent to the MN 110 transferred from the pAR 120 (a packet for CoA used by the MN 110 connected to the pAR 120) is once stored in an FMIP buffer (an FMIP buffer 1306 shown in FIG. 4 described later). On the other hand, according to the first embodiment of the present invention, the MN 110 notifies the nAR 130 of a buffer time (shown as buff_time/flow in FIG. 1) corresponding to each flow label via the pAR 120. Moreover, when the nAR 130 transfers the packet stored in the FMIP buffer to the MN 110, it is judged whether or not a storage time of the packet stored in the FMIP buffer exceeds the corresponding buffer time. It is controlled so that the packet stored in excess of the buffer time is not transferred to the MN 110.

Figure 2:
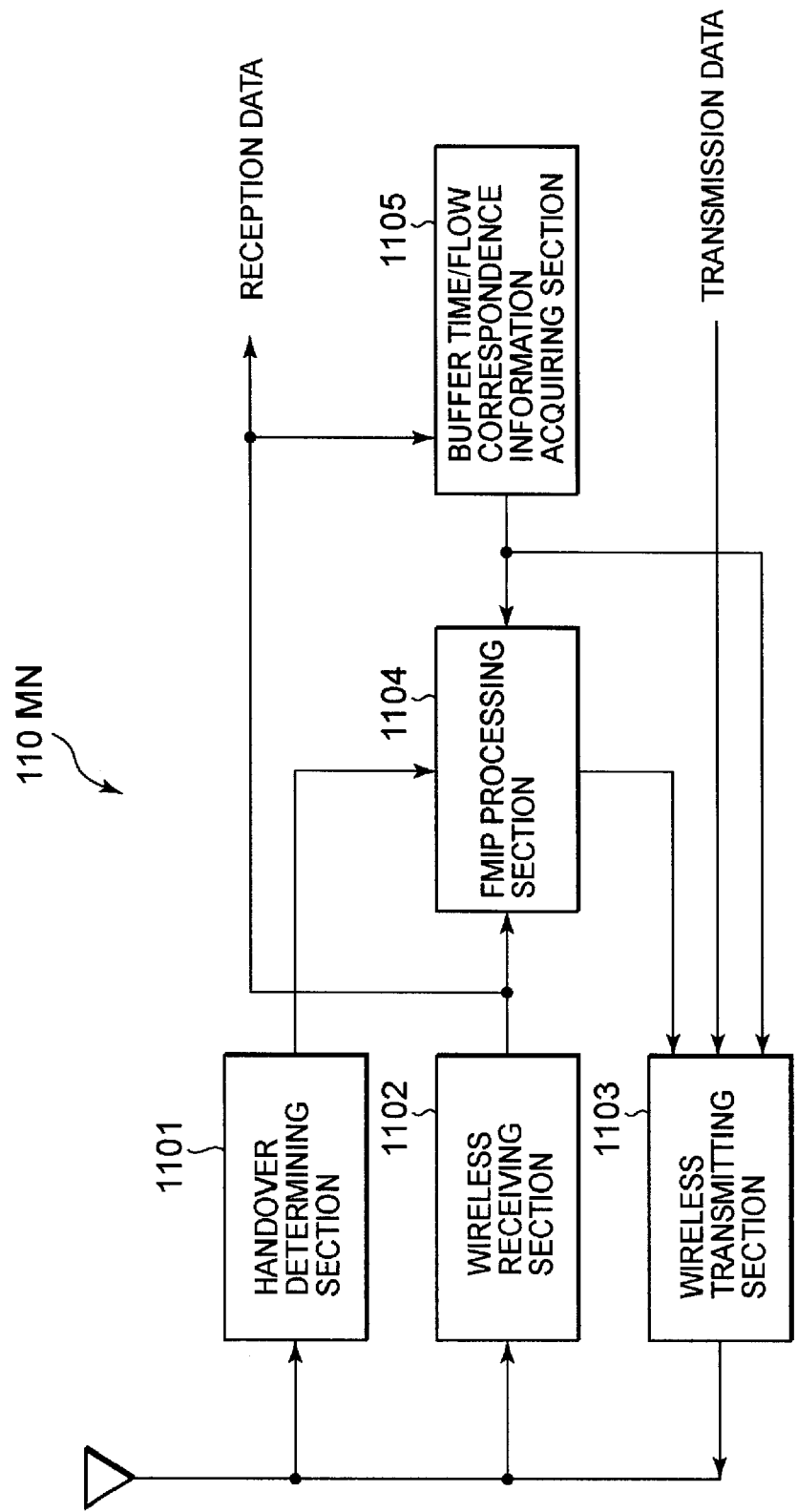
FIG. 2 is a diagram showing one example of a constitution of an MN according to the first embodiment of the present invention.
Figure 3:
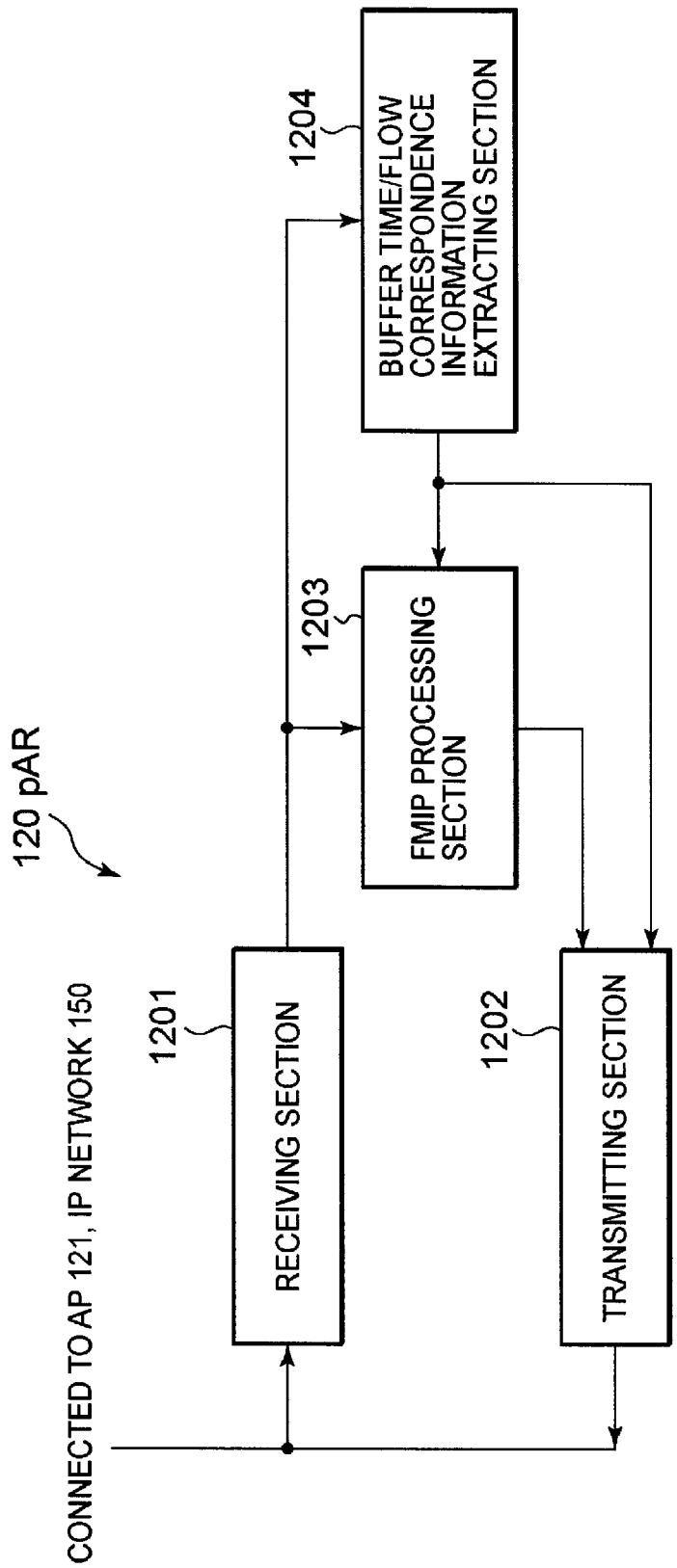
FIG. 3 is a diagram showing one example of a constitution of a pAR according to the first embodiment of the present invention.

Next, constitutions of the MN 110, the pAR 120 and the nAR 130 shown in FIG. 1 will be described with reference to FIGS. 2 to 4, respectively. It is to be noted that the FMIP described above will be described as one example of the handover mechanism, and a case where concept of the present invention is applied to the FMIP will be described. FIGS. 2 to 4 show blocks of functions. These functions can be realized by hardware and/or software. Especially, main processing of the present invention (e.g., processing of each step shown in FIG. 5 described later) can be executed in accordance with a computer program.

FIG. 2 is a diagram showing one example of a constitution of the MN according to the first embodiment of the present invention. It is to be noted that FIG. 2 shows a detailed constitution example of the MN 110 shown in FIG. 1. The MN 110 shown in FIG. 2 has a handover determining section 1101, a wireless receiving section 1102, a wireless transmitting section 1103, an FMIP processing section 1104 and a buffer time/flow correspondence information acquiring section 1105.

The handover determining section 1101 is, for example, a processing section of comparing radio wave intensities from a plurality of different APs to perform L2 handover (switching of connection to the AP of a destination) to the AP having the highest radio wave intensity. The section thus determines start of the handover based on arbitrary conditions.

Moreover, the wireless receiving section 1102 and the wireless transmitting section 1103 are processing sections which receive and transmit data by wireless communication, respectively, and these sections include various functions required for performing the wireless communication.

Furthermore, the FMIP processing section 1104 is a processing section which receives the determination of the start of the handover by the handover determining section 1101 to perform processing concerned with the FMIP, for example, generation of a transmission message (e.g., an RtSolPr message and an FBU message) concerned with the FMIP, processing of a reception message (e.g., a PrRtAdv message and an FBAck message) concerned with the FMIP and the like. It is to be noted that the presence of this FMIP processing section 1104 indicates that the MN 110 is provided with the FMIP.

In addition, the buffer time/flow correspondence information acquiring section 1105 is a processing section which acquires information (hereinafter referred to as buffer time/flow correspondence information in some case) indicating a correspondence between a delay allowance time (corresponding to the buffer time described above) of an application which can be grasped at an application level and a flow label inserted into a header of the packet in order to identify an application with reference to the header of the packet received by the wireless receiving section 1102. The buffer time/flow correspondence information acquired by the buffer time/flow correspondence information acquiring section 1105 is supplied to the FMIP processing section 1104, and transmitted to the pAR 120 together with the transmission message concerned with the FMIP, or transmitted as an inherent message for notification in accordance with a transmission timing of the transmission message concerned with the FMIP and a reception timing of the reception message. It is to be noted that in a case where a plurality of applications exist, it is possible to acquire information in which flow labels corresponding to the plurality of applications, respectively, are associated with the buffer time corresponding to each flow label.

As described above, the MN 110 is configured to be capable of grasping the buffer time/flow correspondence information determined at the application level, embedding the buffer time/flow correspondence information in the transmission message concerned with the FMIP to transmit the information to the pAR 120, and transmitting the message for notification including the buffer time/flow correspondence information to the pAR 120 in accordance with the transmission timing of the transmission message concerned with the FMIP and the reception timing of the reception message.

Moreover, FIG. 3 is a diagram showing one example of a constitution of the pAR according to the first embodiment of the present invention. It is to be noted that FIG. 3 shows a detailed constitution example of the pAR 120 shown in FIG. 1. The pAR 120 shown in FIG. 3 has a receiving section 1201, a transmitting section 1202, an FMIP processing section 1203 and a buffer time/flow correspondence information extracting section 1204. It is to be noted that the pAR 120 has a transfer section which transfers the received packet and the like, but here the section is omitted in the drawing. The receiving section 1201 and the transmitting section 1202 are processing sections which are connected to the AP 121 existing under the pAR 120 and the IP network 150 and which receive and transmit data.

In addition, the FMIP processing section 1203 is a processing section which performs processing concerned with the FMIP, for example, searching for the access router (the nAR 130) of a destination to be connected to the MN 110 during the subsequent handover, acquiring of a network prefix of a subnet formed by the nAR 130, generation of the transmission message (e.g., an HI message and an FBAck message) concerned with the FMIP, processing of the reception message (e.g., an FBU message and an HAck message) concerned with the FMIP and the like. It is to be noted that the presence of this FMIP processing section 1203 indicates that the pAR 120 is provided with the FMIP.

Moreover, the buffer time/flow correspondence information extracting section 1204 is a processing section which extracts the buffer time/flow correspondence information embedded in the reception message concerned with the FMIP received from the MN 110 and which extracts the buffer time/flow correspondence information from the inherent message for notification received from the MN 110. The buffer time/flow correspondence information extracted by the buffer time/flow correspondence information extracting section 1204 is supplied to the FMIP processing section 1203 and transmitted to the nAR 130 together with the transmission message concerned with the FMIP, or transmitted as the inherent message for notification to the nAR 130 in accordance with the transmission timing of the transmission message concerned with the FMIP and the reception timing of the reception message.

As described above, when the pAR 120 receives notice of the buffer time/flow correspondence information from the MN 110, the pAR can embed the buffer time/flow correspondence information in the transmission message concerned with the FMIP to transmit the information to the nAR 130, and can transmit the message for notification including the buffer time/flow correspondence information to the nAR 130 in accordance with the transmission timing of the transmission message concerned with the FMIP and the reception timing of the reception message.

Figure 4:
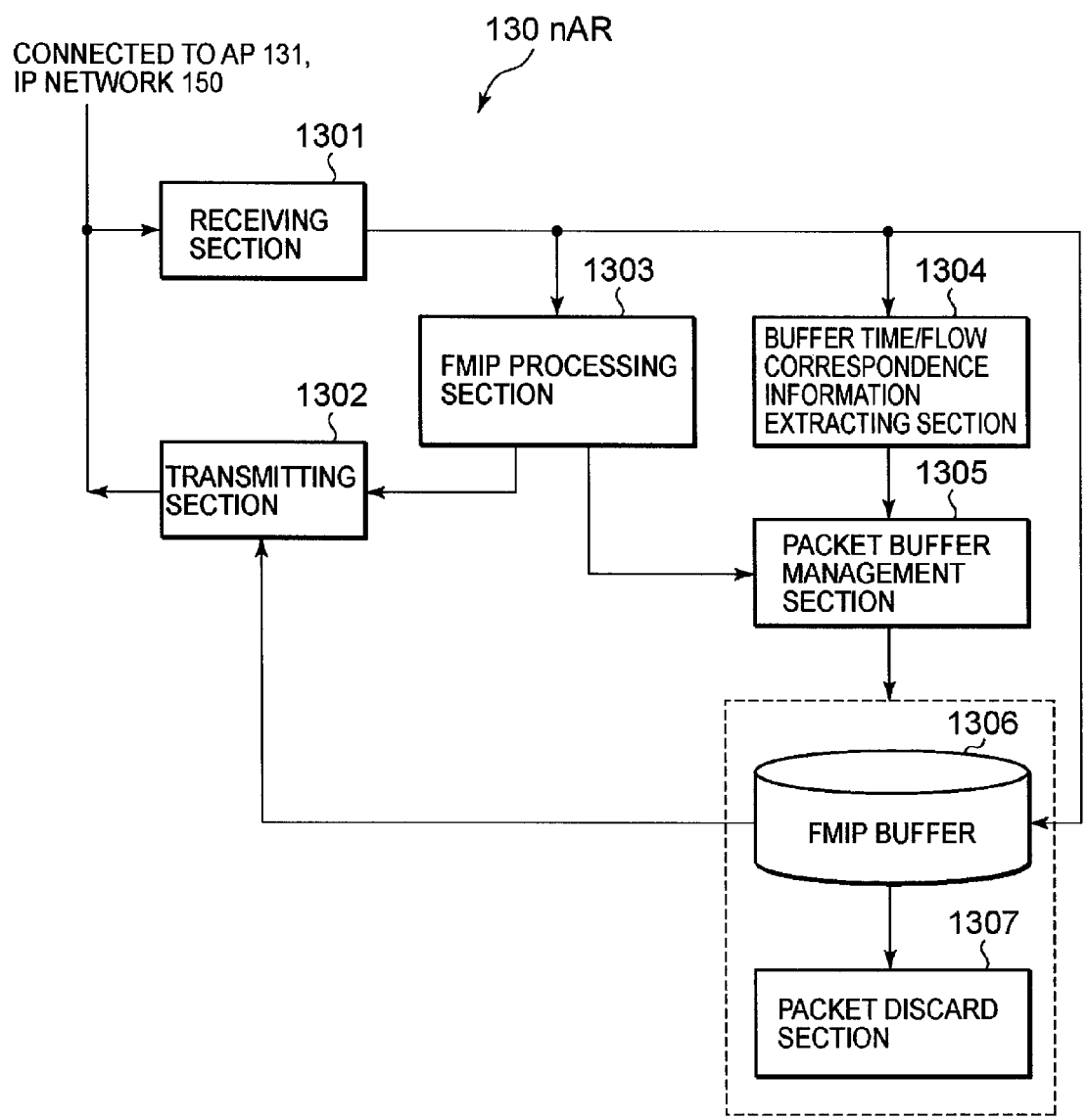
FIG. 4 is a diagram showing one example of a constitution of an nAR according to the first embodiment of the present invention.

Furthermore, FIG. 4 is a diagram showing one example of the constitution of the nAR according to the first embodiment of the present invention. It is to be noted that FIG. 4 shows a detailed constitution example of the nAR 130 shown in FIG. 1. The nAR 130 shown in FIG. 4 has a receiving section 1301, a transmitting section 1302, an FMIP processing section 1303, a buffer time/flow correspondence information extracting section 1304, a packet buffer management section 1305, the FMIP buffer 1306 and a packet discarding section 1307. It is to be noted that the nAR 130 has a transfer section which transfers the received packet and the like, but here the section is omitted in the drawing.

The receiving section 1301 and the transmitting section 1302 are processing sections which are connected to the AP 131 existing under the nAR 130 and the IP network 150 and which receive and transmit data. The FMIP processing section 1303 is a processing section which performs processing concerned with the FMIP, for example, verification of adequacy of an IP address of the MN 110 received from the pAR 120, generation of the transmission message (e.g., an HAck message) concerned with the FMIP, processing of the reception message (e.g., an HI message and an FNA message) concerned with the FMIP and the like. It is to be noted that the presence of the FMIP processing section 1303 indicates that the nAR 130 is provided with the FMIP.

Moreover, the buffer time/flow correspondence information extracting section 1304 is a processing section which extracts the buffer time/flow correspondence information embedded in the reception message concerned with the FMIP received from the pAR 120 and which extracts the buffer time/flow correspondence information from the inherent message for notification received from the pAR 120. The buffer time/flow correspondence information extracted by the buffer time/flow correspondence information extracting section 1304 is supplied to the packet buffer management section 1305.

Furthermore, the packet buffer management section 1305 is a processing section which performs control of packet storage in the FMIP buffer 1306, instruction to the packet discarding section 1307 to discard the packet stored in the FMIP buffer 1306, instruction to transfer the packet of the FMIP buffer 1306 to the MN 110 and the like based on the buffer time/flow correspondence information extracted by the buffer time/flow correspondence information extracting section 1304. It is to be noted that the instruction to transfer the packet stored in the FMIP buffer 1306 to the MN 110 is performed, for example, in a case where the nAR 130 receives the FNA message from the MN 110 through the AP 131. Furthermore, the packet buffer management section 1305 has a timer function, and can measure, for example, a time elapsed from a time (a storage start time) when the packets are stored in the FMIP buffer 1306.

In addition, the FMIP buffer 1306 is a packet storage section in which the packet to be sent to the MN 110 transferred from the pAR 120 is stored as defined by the FMIP. This FMIP buffer 1306 is basically required to once store all the packets to be sent to the MN 110 transferred from the pAR 120.

Moreover, the packet discarding section 1307 is a processing section which selectively discards the packet stored in the FMIP buffer 1306 based on the instruction of the packet buffer management section 1305. The packet buffer management section 1305 sends, to the packet discarding section 1307, the instruction to discard, for example, the packet stored for the buffer time corresponding to each flow label grasped from the buffer time/flow correspondence information or longer among the packets stored in the FMIP buffer 1306.

As described above, when the nAR 130 receives the buffer time/flow correspondence information notified by the MN 110 via the pAR 120, the nAR can discard the packet stored in the FMIP buffer 1306 for the buffer time of each flow label grasped from the buffer time/flow correspondence information or longer, and transfer, to the MN 110, the remaining packets stored in the FMIP buffer 1306 (the packet having the storage time which does not exceed the buffer time corresponding to each flow label).

Figure 5:
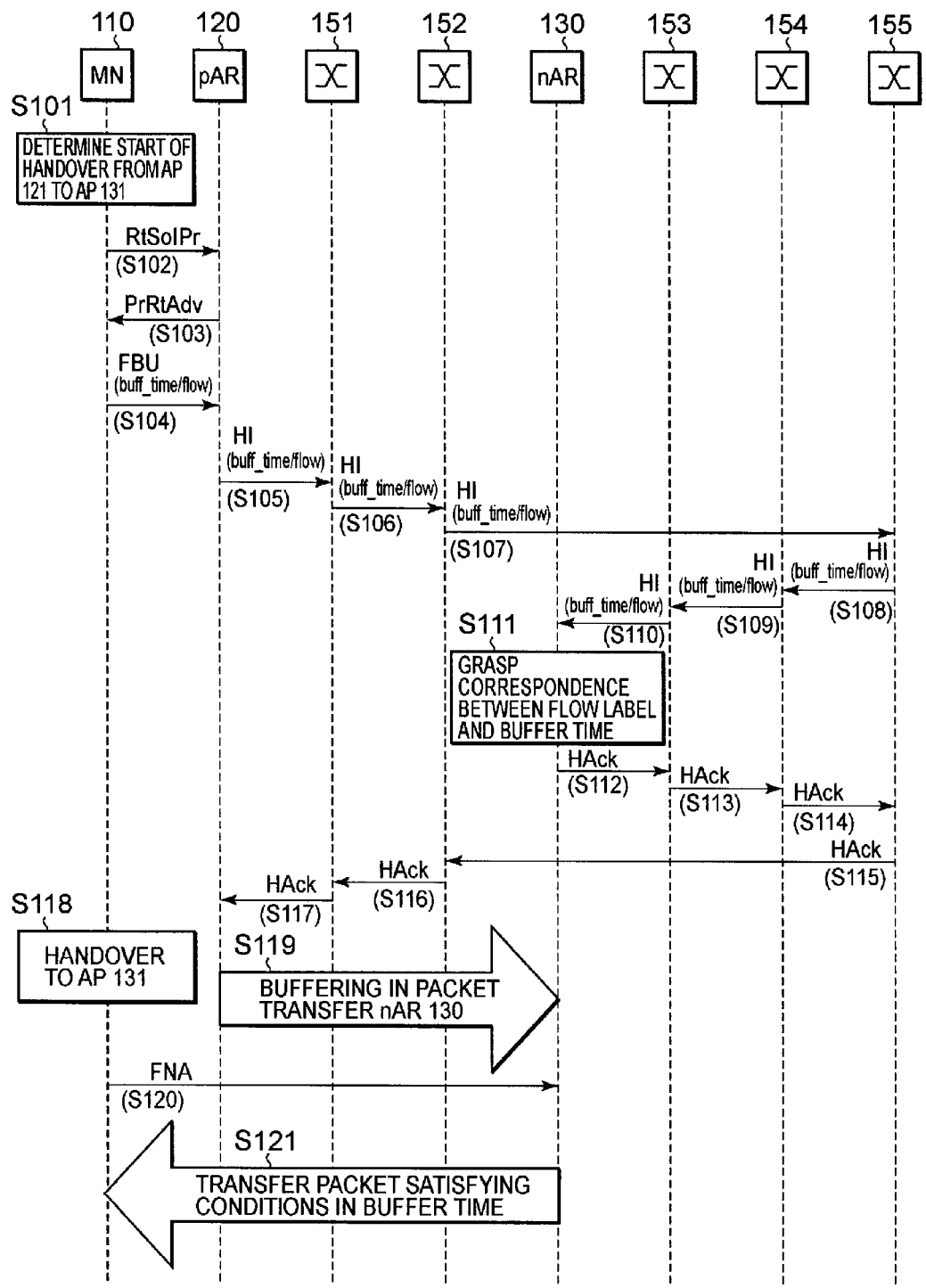
FIG. 5 is a sequence chart showing an operation example which optimizes packet transfer in a case where the MN performs handover according to the first embodiment of the present invention.

Next, an operation according to the first embodiment of the present invention will be described. First, an operation in a case where the MN 110, the pAR 120 and the nAR 130 shown in FIGS. 2 to 4 are constituting elements in the network constitution shown in FIG. 1 will be described with reference to FIG. 5. FIG. 5 is a sequence chart showing an operation example which realizes optimization of packet transfer in a case where the MN performs the handover according to the first embodiment of the present invention. It is to be noted that FIG. 5 shows a case where the MN 110 performs an operation based on an operation mode (a predictive mode) to transmit the FBU message at the link before the handover according to the FMIP.

For example, when the MN 110 starts moving from an area of the pAR 120 (a communication cell region of the AP 121) to an area of the nAR 130 (a communication cell region of the AP 131), Layer 2 detects the movement. Starting with this detection, start of handover of Layer 3 is determined (step S101). The start of this handover is determined by, for example, comparison of a reception electric intensity from the AP 121 with that from the AP 131 or the like.

The MN 110 acquires information including AP-ID (identification information of each AP) from the AP 131 in accordance with beacon from the AP 131 as a movement destination, and transmits the RtSolPr message including the AP-ID of the AP 131 to presently connected pAR 120 (step S102). The pAR 120 which has received this RtSolPr message searches for the access router existing in the neighborhood to acquire the information of the nAR 130 based on the AP-ID of the AP 131 notified from the MN 110, or acquires the information of the nAR 130 from the already searched information (the information retained in the pAR 120).

Moreover, the pAR 120 transmits, as a response to the RtSolPr message, the PrRtAdv message including the information of the nAR 130 (e.g., information such as the network prefix of the subnet constituted by the nAR 130) to the MN 110 (step S103). The MN 110 which has received the PrRtAdv message generates NCoA which is an address adaptable to the subnet formed of the nAR 130 by use of the network prefix of the subnet formed of the nAR 130 included in the PrRtAdv message, a link layer address of the MN 110 itself and the like. It is to be noted that the operation up to this step is the same as that defined according to the FMIP.

Here, the MN 110 generates the FBU message including this NCoA. At this time, the information (the buffer time/flow correspondence information, shown as buff_time/flow in FIG. 5) in which the buffer time corresponding to the delay allowance time in each application grasped by the buffer time/flow correspondence information acquiring section 1105 is associated with the flow label to specify each application using the packet is embedded in the FBU message. It is to be noted that, in a case where a plurality of applications perform packet communication and a plurality of flow labels exist, all of the buffer time/flow correspondence information or a selected part of the buffer time/flow correspondence information may be embedded in the FBU message. To selectively transmit the buffer time/flow correspondence information, it is especially preferable to select the buffer time/flow correspondence information concerned with a delay sensitive application. Moreover, the MN 110 transmits, to the pAR 120, the FBU message (shown as FBU (buff_time/flow) in FIG. 5) in which the buffer time/flow correspondence information is embedded (step S104).

The pAR 120 which has received the FBU message including the buffer time/flow correspondence information embedded therein extracts the buffer time/flow correspondence information from the FBU message by the buffer time/flow correspondence information extracting section 1204, and notifies the FMIP processing section 1203 of the extracted buffer time/flow correspondence information. In a case where the HI message is generated in order to confirm whether or not the NCoA generated by the MN 110 is an address usable in the subnet of the nAR 130, the FMIP processing section 1203 embeds the buffer time/flow correspondence information received from the MN 110 in the HI message, and then transmits, to the nAR 130, the HI message (shown as HI (buff_time/flow) in FIG. 5) in which the buffer time/flow correspondence information is embedded (step S105). It is to be noted that the HI message is provided with an option (a buffer flag) for requesting the buffering of the packet to be sent to the MN 110 in the nAR 130, and this option needs to be set. The FMIP processing section 1203 simultaneously performs the usual processing concerned with the FMIP based on the information in the FBU message.

The HI message transmitted from the pAR 120 to the nAR 130 and including the buffer time/flow correspondence information embedded therein reaches the nAR 130 via the IP network 150. It is to be noted that here owing to a network constitution, the HI message including the buffer time/flow correspondence information embedded therein is transferred to the intermediate nodes 151, 152, 155, 154 and 153 in order to reach the nAR 130 (steps S106 to S110).

On received the HI message in which the buffer time/flow correspondence information is embedded, the nAR 130 extracts the buffer time/flow correspondence information from the HI message by the buffer time/flow correspondence information extracting section 1304, and notifies the packet buffer management section 1305 of the extracted buffer time/flow correspondence information. In consequence, the buffer time corresponding to each flow label of the packet stored in the FMIP buffer 1306 is grasped based on one set or a plurality of sets of buffer time/flow correspondence information transmitted from the MN 110 (step S111).

Moreover, the FMIP processing section 1303 of the nAR 130 simultaneously performs processing concerned with the usual FMIP. For example, the nAR 130 verifies whether or not the NCoA included in the HI message in which the buffer time/flow correspondence information is embedded is valid. Moreover, if the NCoA is valid, the HAck message which has designated a status indicating a result of the verification is transmitted to the pAR 120 (step S112), and the HAck message transmitted from the nAR 130 to the pAR 120 reaches the pAR 120 via the IP network 150. It is to be noted that here owing to the network constitution, the HAck message is transferred to the intermediate nodes 153, 154, 155, 152 and 151 in order to reach the pAR 120 (steps S113 to S117).

On receiving the HAck message, the pAR 120 grasps that the nAR 130 has completed preparation for the buffering of the packet to be sent to the MN 110. Moreover, for example, from a time when the MN 110 performs the L2 handover to the AP 131 in a step S118 (i.e., from a time when the connection to the AP 121 is cut), the pAR 120 starts transferring the packet to be sent to the MN 110 to the nAR 130, and further starts buffering the packet to be sent to the MN 110 (step S119). It is to be noted that the pAR 120 which has received the HAck message, for example, transmits the FBAck message based on the usual FMIP processing, but description thereof is omitted here.

The MN 110 which has completed to the L2 handover to the AP 131 further transmits, to the nAR 130, the FNA message to notify the connection to the nAR 130 in order to secure a connection property to the nAR 130 (step S120). On receiving this FNA message, the nAR 130 detects that the MN 110 is connected to a point under the nAR 130. Moreover, the nAR 130 transfers the packet stored in the FMIP buffer 1306 to the MN 110 for a time shorter than the buffer time having a correspondence with respect to the packet of each flow label (a time which does not exceed the buffer time) based on the correspondence between the flow label of the packet grasped in the step S111 and the buffer time. On the other hand, the packet stored for the buffer time or more (the time which exceeds the buffer time) is discarded by the packet discarding section 1307, and the packet transfer processing to the MN 110 is not performed (step S121).

It is to be noted that all the packets to be sent to the MN 110 are stored beforehand in the FMIP buffer 1306. To transfer the packet to the MN 110, the nAR 130 may select the packet stored in the FMIP buffer 1306 for the time in excess of the buffer time, and does not transfer such a packet. In a case where the packet stored in the FMIP buffer 1306 for the time in excess of the buffer time is detected, the packet may be instantly discarded to save the resource concerned with the buffer of the packet in the nAR 130.

Figures 6, 7:
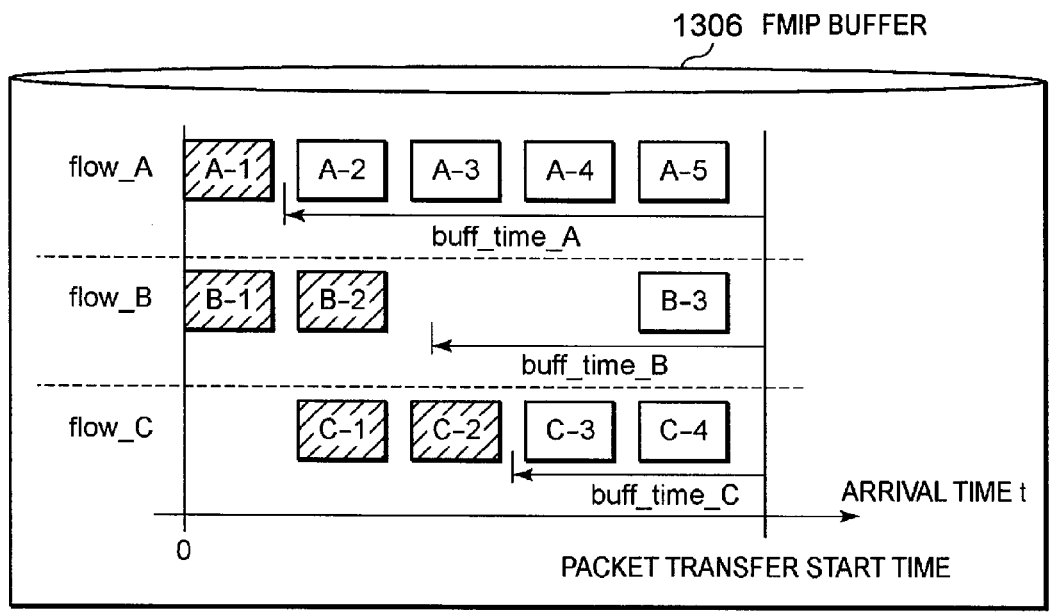
FIG. 6 is a diagram showing one example of buffer time/flow correspondence information notified to the nAR according to the first embodiment of the present invention.
FIG. 7 is a diagram showing a selection method of a packet to be sent to the MN performed by the nAR according to the first embodiment of the present invention.
Figure 8A:
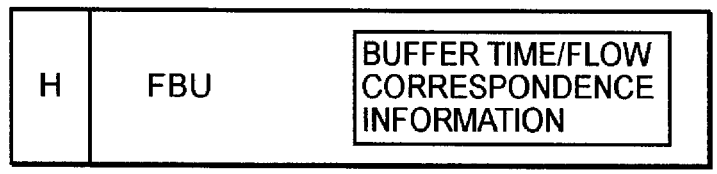
FIG. 8A is a diagram showing an FBU message from the MN to the nAR in which the buffer time/flow correspondence information is embedded for use in the first embodiment of the present invention.
Figure 8B:
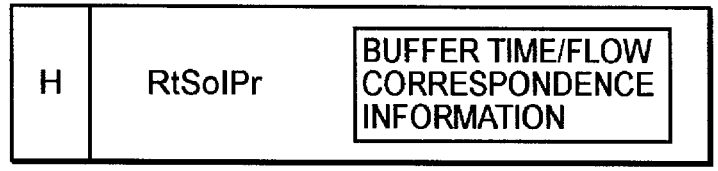
FIG. 8B is a diagram showing an RtSolPr message from the MN to the pAR in which the buffer time/flow correspondence information is embedded for use in the first embodiment of the present invention.
Figure 8C:
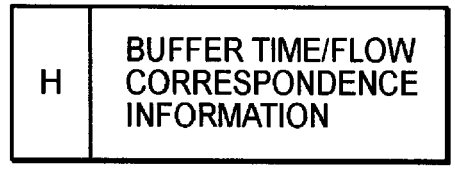
FIG. 8C is a diagram showing a message for notification from the MN to the nAR in which the buffer time/flow correspondence information is embedded for use in the first embodiment of the present invention.
Figure 8D:
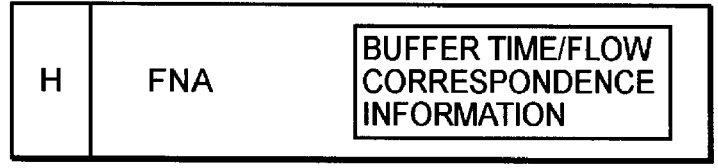
FIG. 8D is a diagram showing an FBU message from the MN to the nAR in which the buffer time/flow correspondence information is embedded for use in the first embodiment of the present invention.

Next, the selection of the packet to be transferred to the MN 110 by the nAR 130 will be described with reference to FIGS. 6 and 7. Here, a case where in which the MN 110 notifies the nAR 130, via the pAR 120, of three types of flow labels (flow labels: flow_A, flow_B and flow_C) and buffer times (buff_time_A, buff_time_B and buff_time_C) set for the flow labels will be described as one example. That is, in the step S111 shown in FIG. 5, the nAR 130 grasps correspondences (see FIG. 6) of the buffer time buff_time_A for the flow label flow_A, the buffer time buff_time_B for the flow label flow_B and the buffer time buff_time_C for the flow label flow_C.

The nAR 130 stores the packet to be sent to the MN 110 transferred from the pAR 120 in the FMIP buffer 1306. During the storage, for example, the packet buffer management section 1305 can start a timer to grasp an arrival time of each packet. It is to be noted that in FIG. 7, a start time of the timer is set to "0", and an arrival time t of the packet is shown along the abscissa. In consequence, the arrival time of the packet having each flow label is shown (e.g., it is assumed that a left end of a figure element indicating the packet is a time when the packet reaches the FMIP buffer 1306). Here, it is assumed that five packets (packets A-1 to A-5) having the flow label flow_A, three packets (packets B-1 to B-3) having the flow label flow_B and four packets (packets C-1 to C-4) having the flow label flow_C are stored in the FMIP buffer 1306.

Moreover, in a case where after the handover, the MN 110 establishes the connection to the nAR 130 in Layer 3 (e.g., immediately after the nAR 130 receives the FNA message from the MN 110 and completes the processing of the message), the nAR 130 starts transferring the packet stored in the FMIP buffer 1306 to the MN 110. At this time, the nAR 130 counts backwards the buffer time of each flow label based on a connection establishment time of Layer 3 to the MN 110 (i.e., a packet transfer start time), and does not transfer the packets having the flow labels and stored for the buffer time corresponding to each flow label or longer (the packets A-1, B-1, B-2, C-1 and C-2) to the MN 110 to discard the packets. On the other hand, the packets (the packets A-2 to A-5, B-3, C-3 and C-4) which are not stored for an only time that is less than the buffer time corresponding to each flow label are transferred to the MN 110.

In consequence, among the packets having the flow labels, the packet having the storage time which exceeds the buffer time corresponding to each flow label (i.e., the useless packet which is eventually discarded, even if the packet is sent to the MN 110, because the delay allowance time at each application level is elapsed). It can be constituted that the transfer of the useless packet from the nAR 130 to the MN 110 is not performed.

Moreover, in the FMIP buffer 1306, in a case where the packet having the storage time in excess of the buffer time corresponding to each flow label is detected, the packet is instantly discarded. In consequence, it is constituted that the useless packet (the packet which is not finally transferred) is not continuously stored in the FMIP buffer 1306, and the storage resource of the packet can be saved.

According to the operation described above, it can be constituted that the nAR 130 which buffers the packet to be sent to the MN 110 does not transfer any packet that is not required for the MN 110 owing to delay due to an influence of the handover, and the useless packet transfer from the nAR 130 to the MN 110 can be prevented. Furthermore, in a case where the packet which is not required for the MN 110 is detected owing to the delay due to the influence of the handover, the nAR 130 instantly discards this packet. In consequence, the resource concerned with the buffer of the packet can be saved.

It is to be noted that in the first embodiment described above, the case where the MN 110 embeds the buffer time/flow correspondence information in the FBU message to finally notify the nAR 130 of these information has been described, but the buffer time/flow correspondence information may be embedded in the RtSolPr message and the FNA message or an independent message for notification which is not concerned with the message concerned with the FMIP. Especially, a case where the timing of the handover of the MN 110 is earlier than expected and the FBU message cannot be transmitted before the handover is also assumed. In this case, it is effective to embed the buffer time/flow correspondence information in the RtSolPr message or the FNA message to be transmitted after the handover (or the message for notification to be transmitted after the handover). FIG. 8 shows four examples of the message concerned with the notification of the buffer time/flow correspondence information from the MN 110 to the pAR 120. It is to be noted that the information for identifying the MN 110 and information (e.g., identification information of the AP 131) for specifying the next connection destination (the nAR 130) or information for identifying the FBU message to be transmitted from the MN 110 to the pAR 120 need to be inserted into the message for notification to be transmitted from the MN 110 to the pAR 120.

Figure 9A:
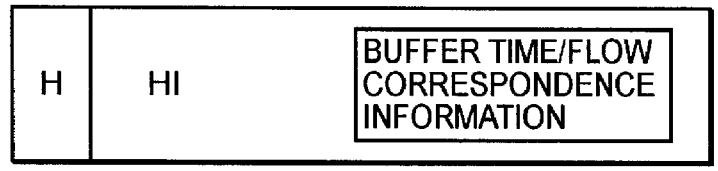
FIG. 9A is a diagram showing an HI message from the pAR to the nAR in which the buffer time/flow correspondence information is embedded for use in the first embodiment of the present invention.
Figure 9B:
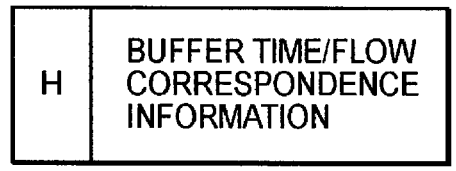
FIG. 9B is a diagram showing a message for notification from the pAR to the nAR in which the buffer time/flow correspondence information is embedded for use in the first embodiment of the present invention.

Moreover, similarly, a case where the pAR 120 embeds the buffer time/flow correspondence information in the HI message has been described, but the buffer time/flow correspondence information may be embedded in the independent message for notification which is not associated with the message concerned with the FMIP. FIG. 9 shows two examples of the message concerned with the notification of the buffer time/flow correspondence information from the pAR 120 to the nAR 130. It is to be noted that the information for identifying the MN 110 or information for identifying the HI message to be transmitted from the pAR 120 to the nAR 130 needs to be inserted into the message for notification to be transmitted from the pAR 120 to the nAR 130.

As described above, according to the above first embodiment, before the handover, the MN 10 notifies the nAR 130 of the information in which the buffer time corresponding to the delay allowance time grasped at the application level is associated with the flow label for identifying the packet for use in the application. The nAR 130 performs the storage/discard processing of the packet based on the buffer time and the processing of determining whether or not the packet transfer is required for each flow label. The nAR 130 does not transfer the packet which is not required for the MN 110 to the MN 110, and the only packet required for the MN 110 is transferred. Therefore, reduction of traffic between the nAR 130 and the MN 110 and saving of the resource in the nAR 130 are realized.

Second Embodiment

Next, the second embodiment of the present invention will be described. In the above first embodiment, the present invention is applied to a predictive mode of an FMIP, and an MN 110 notifies an nAR 130 of buffer time/flow correspondence information via a pAR 120 before handover. In the second embodiment of the present invention, the present invention is applied to the reactive mode of the FMIP, and the MN 110 notifies the pAR 120 of the buffer time/flow correspondence information via the nAR 130 after the handover.

Figure 10:
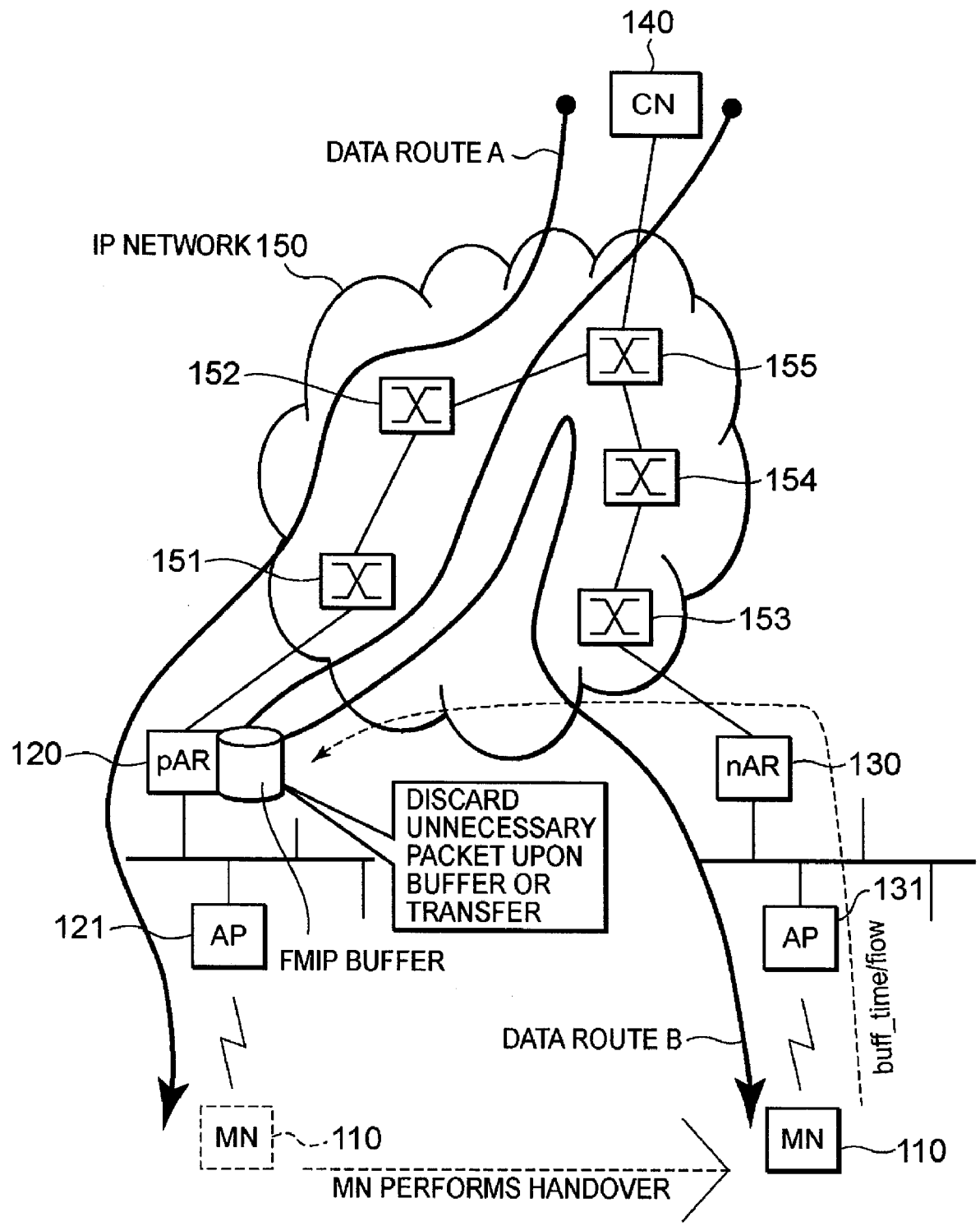
FIG. 10 is a diagram showing one example of a network constitution according to a second embodiment of the present invention.

FIG. 10 is a diagram showing one example of a network constitution according to the second embodiment of the present invention. It is to be noted that constituting elements of a network shown in FIG. 10 are the same as those of the network shown in FIG. 1, and description thereof is omitted.

As shown in FIG. 10, in the second embodiment of the present invention, the MN 110 notifies the pAR 120 of a buffer time (shown as buff_time/flow in FIG. 10) corresponding to each flow label via the nAR 130. Moreover, to transfer the packet stored in the FMIP buffer to the nAR 130, the pAR 120 judges whether or not a storage time of the packet stored in the FMIP buffer exceeds the corresponding buffer time, and performs control so that the packet stored in excess of the buffer time is not transferred to the nAR 130.

Moreover, in the second embodiment of the present invention, the constitution of the MN 110 is basically the same as that shown in FIG. 2 described above. However, since the MN 110 directly notifies the nAR 130 of the buffer time/flow correspondence information after the handover, for example, the MN 110 embeds the buffer time/flow correspondence information in an FNA [FBU] message. The pAR 120 and the nAR 130 have constitutions shown in FIGS. 3 and 4, respectively. It is to be noted that the nAR 130 buffers the packet in the predictive mode. On the other hand, the pAR 120 buffers the packet in a reactive mode. Therefore, the pAR 120 and the nAR 130 have constitutions reverse to those of the first embodiment described above. Even in the second embodiment of the present invention, the buffer time/flow correspondence information may be notified in accordance with an inherent message for notification different from a message concerned with the FMIP in the same manner as in the first embodiment described above.

Figure 11:
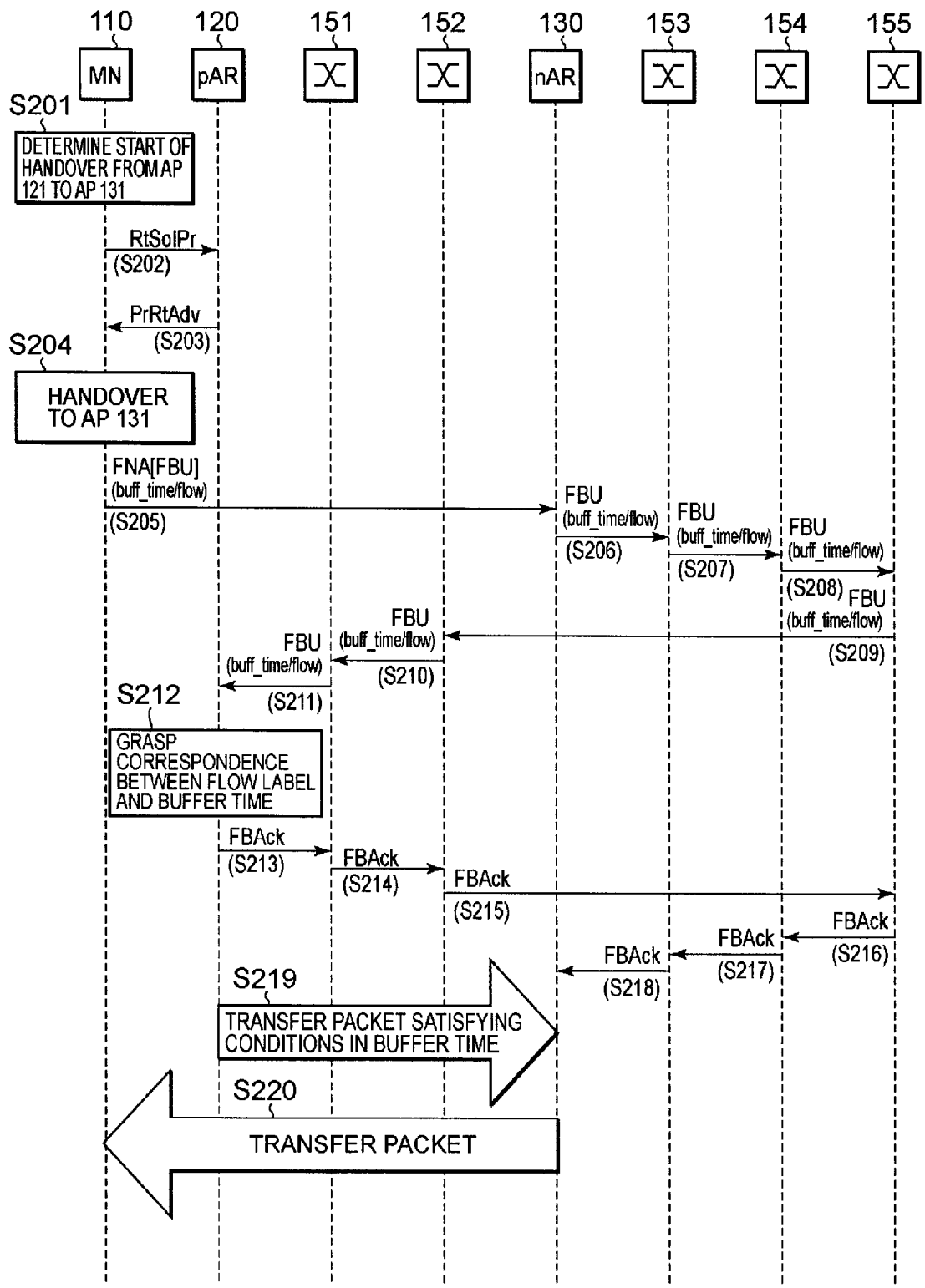
FIG. 11 is a sequence chart showing an operation example for realizing optimization of packet transfer in a case where an MN performs handover according to the second embodiment of the present invention.
Figure 12:
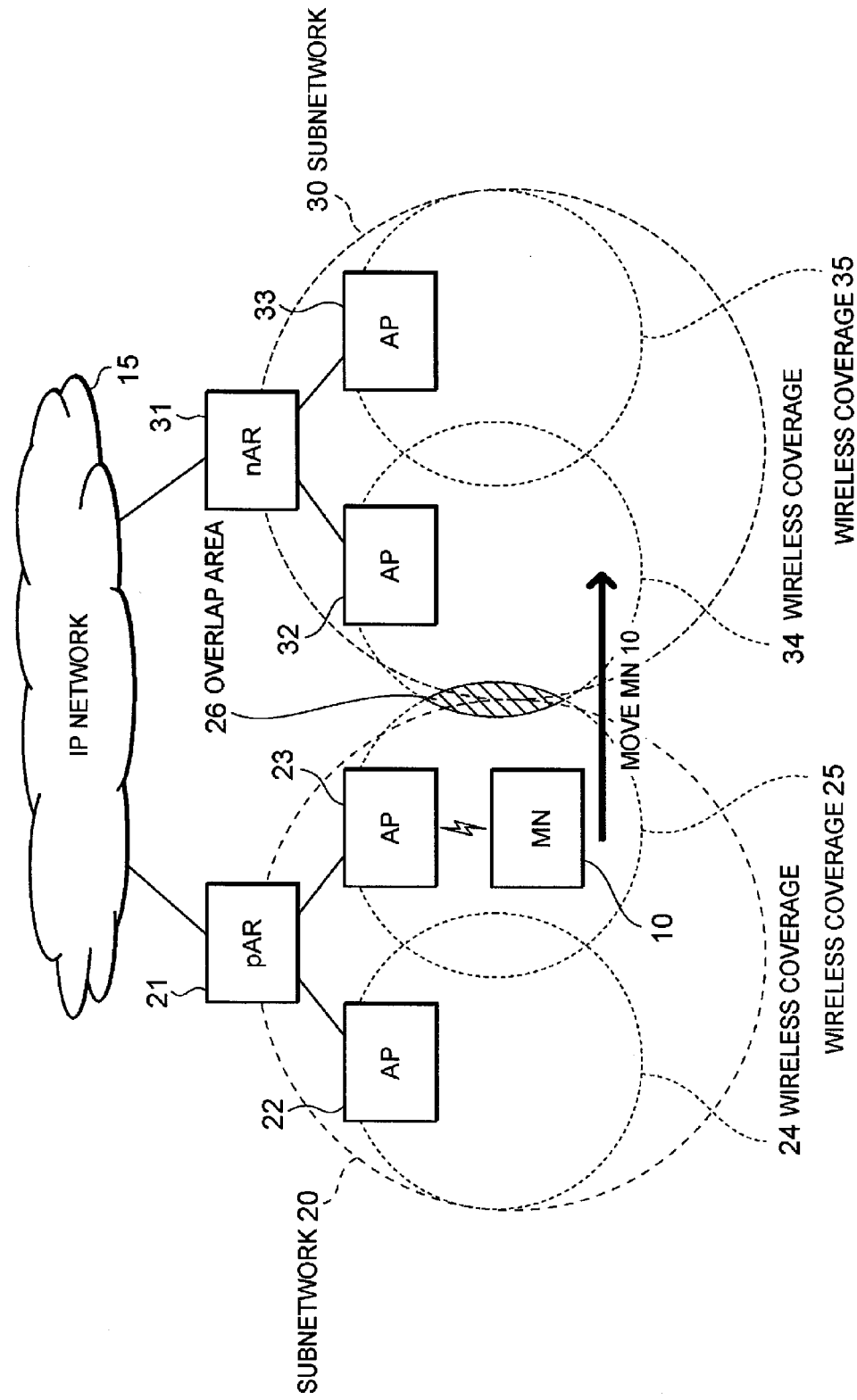
FIG. 12 is a schematic diagram showing a constitution of a wireless communication system common to the present invention and a prior art.
Figure 13:
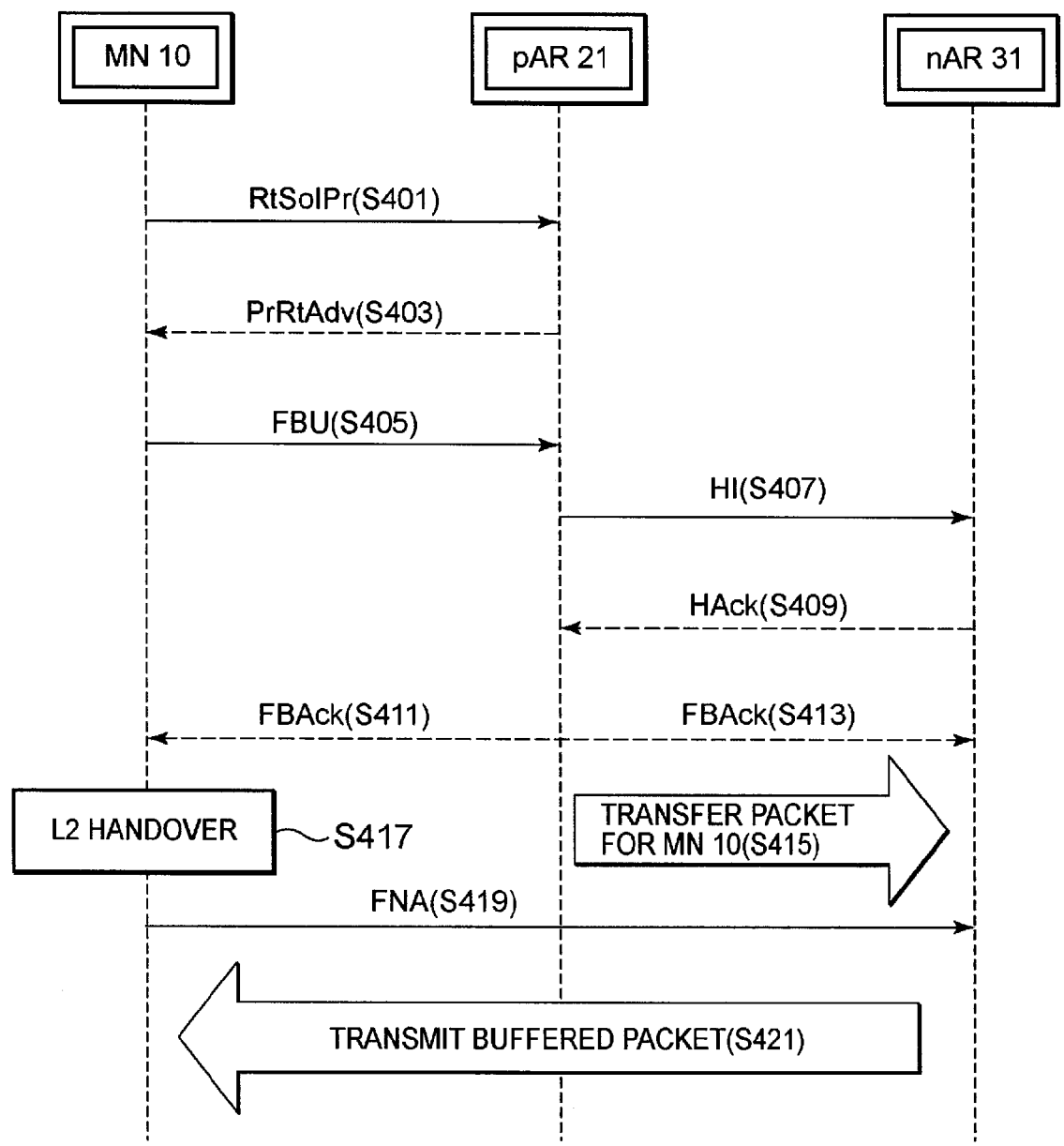
FIG. 13 is a sequence chart showing an outline of an operation mode of an FMIP in a case where an MN of the prior art transmits an FBU message at link before the handover.

Next, an operation of the second embodiment of the present invention will be described. FIG. 11 is a sequence chart showing an operation example for realizing optimization of packet transfer in a case where the MN performs the handover according to the second embodiment of the present invention.

In the sequence chart shown in FIG. 11, operations of steps S201 to S204 are those defined as the reactive mode of conventional FMIP, and the MN 110 establishes link to an AP 131 under the nAR 130. In the reactive mode of the FMIP, the MN 110 generates the FNA [FBU] message including the FBU message including this NCoA to transmit the message to the nAR 130. At this time, information (buffer time/flow correspondence information) in which the buffer time corresponding to a delay allowance time of each application grasped by a buffer time/flow correspondence information acquiring section 1105 is associated with a flow label specifying each application using the packet is embedded in the FBU message (FIG. 11 shows FNA [FBU] (buff_time/flow)) of the FNA message to transmit the information (step S205).

On receiving the FNA [FBU] message in which the buffer time/flow correspondence information is embedded, the nAR 130 extracts the FBU message from the FNA [FBU] message, and transmits the extracted FBU message to the pAR 120. It is to be noted that the FBU message includes the buffer time/flow correspondence information, and the nAR 130 transmits, to the pAR 120, the FBU message (FIG. 11 shows FBU (buff_time/flow)) in which the buffer time/flow correspondence information is embedded (step S206).

The FBU message in which the buffer time/flow correspondence information transmitted from the nAR 130 to the pAR 120 is embedded reaches the pAR 120 via an IP network 150. It is to be noted that here owing to a network constitution, the FBU message in which the buffer time/flow correspondence information is embedded is transferred to intermediate nodes 153, 154, 155, 152 and 151 in order to reach the pAR 120 (steps S207 to S211).

On receiving the FBU message in which the buffer time/flow correspondence information is embedded, the pAR 120 extracts the buffer time/flow correspondence information from the FBU message, and grasps the buffer time corresponding to each flow label of the packet stored in the FMIP buffer based on the extracted buffer time/flow correspondence information (step S212).

Moreover, the pAR 120 simultaneously performs usual processing concerned with the FMIP with respect to the FBU message, and transmits an FBAck message to the nAR 130 (step S213). The FBAck message transmitted from the pAR 120 to the nAR 130 reaches the nAR 130 via the IP network 150. It is to be noted that here owing to the network constitution, the FBAck message is transferred to the intermediate nodes 151, 152, 155, 154 and 153 in order to reach the nAR 130 (steps S214 to S218).

On the other hand, immediately after it is detected that the MN 110 performs the handover (immediately after the step S204), the pAR 120 starts processing to store the packet to be sent to the MN 110 in an FMIP buffer. Moreover, in response to the FBU message from the nAR 130, the pAR 120 detects that a movement destination of the MN 110 is disposed under the nAR 130, and transfers, to the nAR 130, the packet stored in the FMIP buffer for a time (a time which does not exceed the buffer time) shorter than the buffer time having a correspondence with respect to the packet of each flow label based on the correspondence between the flow label of the packet and the buffer time grasped in the step S212. On the other hand, the packet stored for the buffer time or more (the time in excess of the buffer time) is discarded, and the packet is not transferred to the nAR 130 (step S219). The nAR 130 transfers the packet to be sent to the MN 110 transferred from the pAR 120 to the MN 110 connected under the nAR (step S220). In consequence, the only packet required for the MN 110 is supplied.

According to the above operation, it can be constituted that the pAR 120 which buffers the packet to be sent to the MN 110 does not transfer the packet that is not required for the MN 110 owing to delay due to an influence of the handover, and the useless packet can be prevented from being transferred from the pAR 120 to the nAR 130 or from the nAR 130 to the MN 110. Furthermore, in a case where the packet which is not required for the MN 110 is detected owing to the delay due to the influence of the handover, this packet is instantly discarded. In consequence, a resource concerned with the buffer of the packet can be saved.

As described above, according to the above second embodiment, after the handover, the MN 110 notifies the pAR 120 of the information in which the buffer time corresponding to the delay allowance time grasped at the application level is associated with the flow label for identifying the packet for use in the application. The pAR 120 performs the storage/discard processing of the packet based on the buffer time and the processing of determining whether or not the packet transfer is required for each flow label. The packet which is not required for the MN 110 is not transferred from the pAR 120 to the nAR 130 or from the nAR 130 to the MN 110. The only packet required for the MN 110 is transferred. Therefore, reduction of traffic between the pAR 120 and the nAR 130, reduction of traffic between the nAR 130 and the MN 110 and saving of the resource of the pAR 120 are realized.

It is to be noted that the function blocks used in the above description of the embodiments of the present invention are typically realized as large scale integrations (LSIs) as integrated circuits. Each of these circuits may individually be formed into one chip, and a part or all of the circuits may be included in one chip. It is to be noted that the LSI is referred here, but may be referred to as an integrated circuit (an IC), a system LSI, a super LSI or an ultra LSI, depending on a difference of integration.

Moreover, a technology of circuit integration is not limited to the LSI, and a circuit for exclusive use or a processor for general use may be realized. After manufacturing the LSI, a field programmable gate array (FPGA) which can be programmed or a reconfigurable processor capable of reconfiguring connections and settings of circuit cells disposed in the LSI may be used.

Furthermore, if the technology of the circuit integration replacing the LSI according to advancement of a semiconductor technology or derivation of another technology is developed, needless to say, the functional blocks may be integrated using the technology. For example, a biological technology might be applied.

INDUSTRIAL APPLICABILITY

According to a packet transfer control method, a communication message processing method, an access router and a mobile terminal of the present invention, in a handover mechanism in which a packet to be sent to the mobile terminal is buffered during handover and the buffered packet is supplied to the mobile terminal after the handover, it is constituted that a packet which is not required for the mobile terminal is not buffered or transferred. In consequence, the present invention has an effect that optimum packet transfer during the handover and resource saving can be realized. The present invention is applied to a technology concerned with the handover of the mobile terminal which performs wireless communication, and is especially applicable to a technology concerned with the mobile terminal which performs wireless communication using a mobile IPv6.

The invention claimed is:

1. A packet transfer control method in a case where a mobile terminal performs handover from a first access point to a second access point in a communication system in which a first access router having the first access point thereunder is connected to a second access router having the second access point thereunder via a communication network, the method comprising:
   a packet storage step in which at least one of the first and second access routers stores a packet to be sent to the mobile terminal that is arrived while the mobile terminal performs processing concerned with the handover;
   an information notifying step in which the mobile terminal transmits information indicating a correspondence between packet identification information to identify a type of the packet concerned with packet communication performed by the mobile terminal and a time based on a delay allowance time concerned with the packet having the packet identification information to transmit the information indicating the correspondence to at least one of the first and second access routers storing the packets; and
   a transfer control step of performing control so that at least one of the first and second access routers in which the packets are stored does not transfer, to the mobile terminal which has completed the handover, the packet stored in excess of the time based on the delay allowance time among the packets stored in the packet storage step, based on the information indicating the correspondence obtained in the information notifying step, when the packets stored in the packet storage step are transferred, and transferring the remaining packets.

2. A packet transfer control method in a case where a mobile terminal performs handover from a first access point to a second access point in a communication system in which a first access router having the first access point thereunder is connected to a second access router having the second access point thereunder via a communication network, the method comprising:
   a handover determination step in which the mobile terminal connected to the first access point determines that the handover from the first access point to the second access point be performed, and acquires identification information of the second access point from the second access point;
   a first information notifying step in which the mobile terminal notifies the first access router, via the first access point, of information indicating a correspondence between the identification information of the second access point and packet identification information to identify a type of the packet concerned with packet communication performed by the mobile terminal and a time based on a delay allowance time concerned with the packet having the packet identification information;
   a second information notifying step in which the first access router notifies the second access router specified by the identification information notified from the mobile terminal of the information indicating the correspondence;
   a packet storage step in which the second access router stores the packet to be sent to the mobile terminal, while the mobile terminal performs processing concerned with the handover;
   a connection establishment step in which the mobile terminal is connected to the second access point, and then establishes the connection to the second access router; and
   a transfer control step of performing control so that the second access router does not transfer, to the mobile terminal the connection to which has been established in the connection establishment step, the packet stored in excess of the time based on the delay allowance time among the packets stored in the packet storage step, based on the information indicating the correspondence obtained in the second information notifying step, and transferring the remaining packets.

3. The packet transfer control method according to claim 2, wherein the first information notifying step embeds the information indicating the correspondence in an RtSolPr (router solicitation for proxy advertisement) message or an FBU (fast binding update) message of an FMIP (fast handover for mobile IP) to transmit the information from the mobile terminal to the first access router.

4. The packet transfer control method according to claim 2, wherein the second information notifying step embeds the information indicating the correspondence in an HI (handover initiation) message of an FMIP (fast handover for mobile IP) to transmit the information from the first access router to the second access router.

5. A packet transfer control method in a case where a mobile terminal performs handover from a first access point to a second access point in a communication system in which a first access router having the first access point thereunder is connected to a second access router having the second access point thereunder via a communication network, the method comprising:
    a handover determination step in which the mobile terminal connected to the first access point determines that the handover from the first access point to the second access point be performed;
    a connection establishment step in which the mobile terminal is connected to the second access point, and then establishes the connection to the second access router;
    a first information notifying step in which the mobile terminal notifies the second access router, via the second access point, of information indicating a correspondence between identification information of the first access router and packet identification information to identify a type of the packet concerned with packet communication performed by the mobile terminal and a time based on a delay allowance time concerned with the packet having the packet identification information;
    a second information notifying step in which the second access router notifies the first access router specified by the identification information notified from the mobile terminal of the information indicating the correspondence;
    a packet storage step in which the first access router stores the packet to be sent to the mobile terminal, while the mobile terminal performs processing concerned with the handover;
    a transfer control step of performing control so that the first access router does not transfer, to the second access router, the packet stored in excess of the time based on the delay allowance time among the packets stored in the packet storage step, based on the information indicating the correspondence obtained in the second information notifying step, and transferring the remaining packets; and
    a transfer step in which the second access router transfers, to the mobile terminal, the packet received from the first access router.

6. The packet transfer control method according to claim 5, wherein the first information notifying step embeds the information indicating the correspondence in an FNA (fast neighbor advertisement) message including an FBU (fast binding update) message of an FMIP (fast handover for mobile IP) to transmit the information from the mobile terminal to the second access router.

7. The packet transfer control method according to claim 5, wherein the second information notifying step embeds the information indicating the correspondence in an FBU (fast binding update) message of an FMIP (fast handover for mobile IP) to transmit the information from the second access router to the first access router.

8. A packet transfer control method of at least one of first and second access routers in a case where a mobile terminal performs handover from a first access point to a second access point in a communication system in which the first access router having the first access point thereunder is connected to the second access router having the second access point thereunder via a communication network, comprising:
    a packet storage step of storing a packet to be sent to the mobile terminal which is arrived while the mobile terminal performs processing concerned with the handover;
    an information acquiring step of acquiring information which is transmitted by the mobile terminal and which indicates a correspondence between packet identification information to identify a type of the packet concerned with packet communication performed by the mobile terminal and a time based on a delay allowance time concerned with the packet having the packet identification information; and
    a transfer control step of performing control so that the packet stored in excess of the time based on the delay allowance time among the packets stored in the packet storage step is not transferred, based on the information indicating the correspondence obtained in the information acquiring step, when the packets stored in the packet storage step are transferred to the mobile terminal which has completed the handover, and transferring the remaining packets.

9. A communication message processing method of a mobile terminal which performs handover from a first access point to a second access point in a communication system in which a first access router having the first access point thereunder is connected to a second access router having the second access point thereunder via a communication network, comprising:
    a message generation step of generating a message, to notify the first or second access router, of information indicating a correspondence between packet identification information to identify a type of the packet concerned with packet communication performed by the mobile terminal and a time based on a delay allowance time concerned with the packet having the packet identification information,
    wherein said first or second access router is configured to store a packet to be sent to the mobile terminal which is arrived while the mobile terminal performs processing concerned with the handover and is configured to transfer the stored packet to the mobile terminal after the mobile terminal has completed the handover.

10. An access router having an access point thereunder and forming a subnet, the access router comprising:
    packet transfer means for transferring a packet to a mobile terminal connected to the access point;

packet storage means for storing the packet to be sent to the mobile terminal which is arrived while the mobile terminal to perform handover from another subnet to the subnet or the mobile terminal to perform handover from the subnet to the other subnet performs processing concerned with the handover;

information acquiring means for acquiring information which is transmitted by the mobile terminal and which indicates a correspondence between packet identification information to identify a type of the packet concerned with packet communication performed by the mobile terminal and a time based on a delay allowance time concerned with the packet having the packet identification information; and transfer control means for performing control so that the packet stored in excess of the time based on the delay allowance time among the packets stored in the packet storage means is not transferred to the mobile terminal which has completed the handover based on the information indicating the correspondence obtained by the information acquiring means, when the packets stored in the packet storage means are transferred to the mobile terminal, and transferring the remaining packets to the mobile terminal.

11. A mobile terminal which is connected to a subnet formed by an access router having an access point thereunder, the mobile terminal comprising:

a message generation section for generating a message to notify the access router of information indicating a correspondence between packet identification information to identify a type of the packet concerned with packet communication performed by the mobile terminal and a time based on a delay allowance time concerned with the packet having the packet identification information, wherein said access router is configured to store a packet to be sent to the mobile terminal which is arrived while processing concerned with handover is performed in a case where the handover from the certain subnet to another subnet is performed and configured to transfer the stored packet to the mobile terminal after the mobile terminal has completed the handover.

* * * * *